US012786980B2

(12) United States Patent
Lee et al.

(10) Patent No.: US 12,786,980 B2
(45) Date of Patent: Nov. 3, 2026

(54) METHOD AND DEVICE FOR REPORTING CSI IN WIRELESS COMMUNICATION SYSTEM

(71) Applicant: Samsung Electronics Co., Ltd., Suwon-si (KR)

(72) Inventors: Deokhui Lee, Suwon-si (KR); Dongmyung Kim, Suwon-si (KR); Juho Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 295 days.

(21) Appl. No.: 18/496,236

(22) Filed: Oct. 27, 2023

(65) Prior Publication Data

US 2024/0163859 A1 May 16, 2024

(30) Foreign Application Priority Data

Nov. 10, 2022 (KR) ........................ 10-2022-0149583

(51) Int. Cl.
*H04W 72/044* (2023.01)
*H04W 24/02* (2009.01)

(52) U.S. Cl.
CPC ......... *H04W 72/046* (2013.01); *H04W 24/02* (2013.01)

(58) Field of Classification Search
CPC ...... H04W 72/046; H04W 24/02; H04B 7/06; H04B 7/0695; H04B 7/0626;
(Continued)

(56) References Cited

U.S. PATENT DOCUMENTS 10,601,484 B2 3/2020 Yum et al.
11,101,863 B2 8/2021 Kang et al.
(Continued)

FOREIGN PATENT DOCUMENTS

CN 113841342 A 12/2021
JP 2020-536417 A 12/2020
(Continued)

OTHER PUBLICATIONS

International Search Report with Written Opinion dated Feb. 19, 2024; International Appln. No. PCT/KR2023/016925.
(Continued)

*Primary Examiner* — Sujoy K Kundu
*Assistant Examiner* — Raul Rivas
(74) *Attorney, Agent, or Firm* — Jefferson IP Law, LLP

(57) ABSTRACT

The present disclosure relates to a 5G communication system or a 6G communication system for supporting higher data rates beyond a 4G communication system such as long term evolution (LTE). A method for efficiently selecting an optimal beam based on channel state information (CSI) in a 5G or 6G communication system is provided. A method performed by a user equipment (UE) in a wireless communication system is provided. The method includes receiving a message including configuration information for a CSI report from a base station, receiving a plurality of CSI-reference signals (RSs) on different beams from the base station, generating a precoding matrix for the plurality of CSI-RSs, based on the configuration information, and transmitting the CSI report calculated based on the precoding matrix to the base station.

12 Claims, 23 Drawing Sheets

(58) Field of Classification Search
CPC ... H04B 7/0617; H04B 7/0639; H04L 5/0057; H04L 5/001; H04L 5/0023; H04L 5/0048
See application file for complete search history.

(56) References Cited

U.S. PATENT DOCUMENTS 11,581,930 B2 2/2023 Faxer et al.
2016/0065389 A1* 3/2016 Lee ..................... H04L 25/0204 370/252
2019/0341974 A1 11/2019 Kim et al.
2020/0304193 A1 9/2020 Kakishima et al.
2021/0099211 A1* 4/2021 Rahman ............... H04B 7/0639
2021/0175950 A1* 6/2021 Sergeev ............... H04B 7/0634
2021/0336660 A1 10/2021 Faxer et al.
2022/0264318 A1 8/2022 Nilsson et al.
2022/0278796 A1 9/2022 Huang et al.
2022/0322123 A1 10/2022 Kang
2023/0189157 A1* 6/2023 Fan .......................... H01Q 3/24 370/311
2025/0324423 A1* 10/2025 Wang ................... H04B 7/0639

FOREIGN PATENT DOCUMENTS

KR 10-2019-0033615 A 3/2019
KR 10-2019-0035633 A 4/2019
KR 10-2020-0121881 A 10/2020
WO 2021/253205 A1 12/2021

OTHER PUBLICATIONS

Ericsson, Corrections and clarifications for CSI reporting, R1-1806216, 3GPP TSG-RAN WG1 Meeting #93, Busan, Korea, May 12, 2018, XP051462384.
Extended European Search Report dated Oct. 28, 2025, issued in European Patent Application No. 23889004.0.

* cited by examiner

```
38.311, NZP-CSI-RS-Resource information element
Nzp-CSI-RS-ResourceId n,
resourceMapping
  frequencyDomainAllocation,
··· (skip)
 ,
powerControlOffset,

scramblingID,
··· (skip)
precodingScheme  ENUMERATED {PMI, ZF, Regularized ZF, MMSE, ···}
```

FIG.11

```
38.331, NZP-CSI-RS-ResourceSuperSet information element addition:
CSI-RS resource measurement object mapped to CSI report config. is mapped to CSI resource super set
NZP-CSI-RS-ResourceSet ::=          SEQUENCE {
        nzp-CSI-ResourceSetId                   NZP-CSI-RS-ResourceSetId,
        nzp-CSI-RS-Resources                    SEQUENCE (SIZE (1..maxNrofNZP-CSI-RS-ResourcesPerSet)) OF
        NZP-CSI-RS-ResourceId,
        repetition                              ENUMERATED { on, off } OPTIONAL, -- Need S
        aperiodicTriggeringOffset               INTEGER(0..6) OPTIONAL, -- Need S
        trs-Info                                ENUMERATED {true} OPTIONAL, -- Need R
        ...
}
NZP-CSI-RS-ResourceSuprSet ::=      SEQUENCE {
        Nzp-CSI-ResourceSuperSetId              NZP-CSI-RS-ResourceSuperSetId,
        nzp-CSI-ResourceSetId                   NZP-CSI-RS-ResourceSetId,
        ...
}
NZP-CSI-RS-ResourceSuperSetId       INTEGER (0..maxNrofNZP-CSI-RS-ResourceSuperSets-1)
maxNrofNZP-CSI-RS-ResourceSuperSets: Maximum number of NZP CSI-RS resources super set per cell
```

FIG.15

38.311, NZP-CSI-RS-Resource information element
Nzp-CSI-RS-ResourceId n,
resourceMapping
  frequencyDomainAllocation,
… (skip)
 ,
powerControlOffset, scramblingID,
… (skip)

| | |
|---|---|
| power_offset | (unit: dB) |
| CQI_offset | (unit: integer) |
| spectralEfficiency_offset | (unit: bps/Hz) |

nzp-CSI-RS-ResourceId n+1,
… (skip)

FIG.16

```
38.311, NZP-CSI-RS-ResourceSet information element
nzp-CSI-RS-ResourceSetToAddModList
    nzp-CSI-ResourceSetId m,
    nzp-CSI-RS-Resources
      n,
      n+1,
      …..
    power_offsetForSet                  (unit: dB)
    CQI_offsetForSet                    (unit: integer)
    spectralEfficiency_offsetForSet     (unit: bps/Hz)
nzp-CSI-ResourceSetId m+1,
    … (skip)
```

FIG.17

```
nzp-CSI-RS-ResourceSuperSetToAddModList
    nzp-CSI-ResourceSuperSetId k,
    nzp-CSI-ResourceSetId
     m,
     m+1,
     .....
```

FIG.18

| CQI index | modulation | code rate x 1024 | efficiency | Required SNR |
|---|---|---|---|---|
| 0 | out of range | | | ... (It can be obtained by simulation or analysis) |
| 1 | QPSK | 78 | 0.1523 | |
| 2 | QPSK | 193 | 0.3770 | |
| 3 | QPSK | 449 | 0.8770 | |
| 4 | 16QAM | 378 | 1.4766 | |
| 5 | 16QAM | 490 | 1.9141 | |
| 6 | 16QAM | 616 | 2.4063 | |
| 7 | 64QAM | 466 | 2.7305 | |
| 8 | 64QAM | 567 | 3.3223 | |
| 9 | 64QAM | 666 | 3.9023 | |
| 10 | 64QAM | 772 | 4.5234 | |
| 11 | 64QAM | 873 | 5.1152 | |
| 12 | 256QAM | 711 | 5.5547 | |
| 13 | 256QAM | 797 | 6.2266 | |
| 14 | 256QAM | 885 | 6.9141 | |
| 15 | 256QAM | 948 | 7.4063 | |

FIG.21

| CQI index | modulation | code rate x 1024 | efficiency | Expected CQI index |
|---|---|---|---|---|
| 0 | out of range | | | |
| 1 | QPSK | 78 | 0.1523 | |
| 2 | QPSK | 193 | 0.3770 | |
| 3 | QPSK | 449 | 0.8770 | |
| 4 | 16QAM | 378 | 1.4766 | |
| 5 | 16QAM | 490 | 1.9141 | |
| 6 | 16QAM | 616 | 2.4063 | |
| 7 | 64QAM | 466 | 2.7305 | |
| 8 | 64QAM | 567 | 3.3223 | |
| 9 | 64QAM | 666 | 3.9023 | |
| 10 | 64QAM | 772 | 4.5234 | |
| 11 | 64QAM | 873 | 5.1152 | |
| 12 | 256QAM | 711 | 5.5547 | |
| 13 | 256QAM | 797 | 6.2266 | |
| 14 | 256QAM | 885 | 6.9141 | |
| 15 | 256QAM | 948 | 7.4063 | |

FIG.22

METHOD AND DEVICE FOR REPORTING CSI IN WIRELESS COMMUNICATION SYSTEM

CROSS-REFERENCE TO RELATED APPLICATION(S)

This application is based on and claims priority under 35 U.S.C. § 119(a) of a Korean patent application number 10-2022-0149583, filed on Nov. 10, 2022, in the Korean Intellectual Property Office, the disclosure of which is incorporated by reference herein in its entirety.

BACKGROUND

1. Field

The disclosure relates to a wireless communication system. More particularly, the disclosure relates to a method and a device for reporting channel state information (CSI) in a wireless communication system.

2. Description of Related Art

Considering the development of wireless communication from generation to generation, the technologies have been developed mainly for services targeting humans, such as voice calls, multimedia services, and data services. Following the commercialization of 5G (5th generation) communication systems, it is expected that the number of connected devices will exponentially grow. Increasingly, these will be connected to communication networks. Examples of connected things may include vehicles, robots, drones, home appliances, displays, smart sensors connected to various infrastructures, construction machines, and factory equipment. Mobile devices are expected to evolve in various form-factors, such as augmented reality glasses, virtual reality headsets, and hologram devices. In order to provide various services by connecting hundreds of billions of devices and things in the 6G (6th generation) era, there have been ongoing efforts to develop improved 6G communication systems. For these reasons, 6G communication systems are referred to as beyond-5G systems.

6G communication systems, which are expected to be commercialized around 2030, will have a peak data rate of tera (1,000 giga)-level bit per second (bps) and a radio latency less than 100 μsec, and thus will be 50 times as fast as 5G communication systems and have the 1/10 radio latency thereof.

In order to accomplish such a high data rate and an ultra-low latency, it has been considered to implement 6G communication systems in a terahertz (THz) band (for example, 95 gigahertz (GHz) to 3 THz bands). It is expected that, due to severer path loss and atmospheric absorption in the terahertz bands than those in mmWave bands introduced in 5G, technologies capable of securing the signal transmission distance (that is, coverage) will become more crucial. It is necessary to develop, as major technologies for securing the coverage, Radio Frequency (RF) elements, antennas, novel waveforms having a better coverage than Orthogonal Frequency Division Multiplexing (OFDM), beamforming and massive Multiple-Input Multiple-Output (MIMO), Full Dimensional MIMO (FD-MIMO), array antennas, and multiantenna transmission technologies such as large-scale antennas. In addition, there has been ongoing discussion on new technologies for improving the coverage of terahertz-band signals, such as metamaterial-based lenses and antennas, Orbital Angular Momentum (OAM), and Reconfigurable Intelligent Surface (RIS).

Moreover, in order to improve the spectral efficiency and the overall network performances, the following technologies have been developed for 6G communication systems: a full-duplex technology for enabling an uplink transmission and a downlink transmission to simultaneously use the same frequency resource at the same time; a network technology for utilizing satellites, High-Altitude Platform Stations (HAPS), and the like in an integrated manner; an improved network structure for supporting mobile base stations and the like and enabling network operation optimization and automation and the like; a dynamic spectrum sharing technology via collision avoidance based on a prediction of spectrum usage; an use of Artificial Intelligence (AI) in wireless communication for improvement of overall network operation by utilizing AI from a designing phase for developing 6G and internalizing end-to-end AI support functions; and a next-generation distributed computing technology for overcoming the limit of UE computing ability through reachable super-high-performance communication and computing resources (such as Mobile Edge Computing (MEC), clouds, and the like) over the network. In addition, through designing new protocols to be used in 6G communication systems, developing mechanisms for implementing a hardware-based security environment and safe use of data, and developing technologies for maintaining privacy, attempts to strengthen the connectivity between devices, optimize the network, promote softwarization of network entities, and increase the openness of wireless communications are continuing.

It is expected that research and development of 6G communication systems in hyper-connectivity, including person to machine (P2M) as well as machine to machine (M2M), will allow the next hyper-connected experience. Particularly, it is expected that services such as truly immersive eXtended Reality (XR), high-fidelity mobile hologram, and digital replica could be provided through 6G communication systems. In addition, services such as remote surgery for security and reliability enhancement, industrial automation, and emergency response will be provided through the 6G communication system such that the technologies could be applied in various fields such as industry, medical care, automobiles, and home appliances. In a wireless communication system, channel state information (CSI) may be used to measure a state of a channel between a terminal and a base station. Further, the terminal may use CSI feedback to enable the base station to select an appropriate beam. In order to more effectively select an optimal beam, a method in which a terminal, rather than a base station (e.g., gNodeB or gNB), directly determines an optimal beam, based on CSI may be considered.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and a method capable of effectively providing a service in a wireless communication system.

Additional aspects will be set forth in part in the description which follows and, in part, will be apparent from the description, or may be learned by practice of the presented embodiments.

In accordance with an aspect of the disclosure, a method performed by a user equipment (UE) in a wireless communication system is provided. The method comprises receiving a message including configuration information for a channel state information (CSI) report from a base station, receiving a plurality of CSI-reference signals (CSI-RSs) on different beams from the base station, generating a precoding matrix for the plurality of CSI-RSs, based on the configuration information, and transmitting the CSI report calculated based on the precoding matrix to the base station, wherein the CSI report comprises information on a CSI-RS allowing an expected throughput to have a maximum value among the plurality of CSI-RSs.

In accordance with another aspect of the disclosure, a method performed by a base station in a wireless communication system is provided. The method comprises transmitting a message including configuration information for a channel state information (CSI) report to a user equipment (UE), transmitting a plurality of CSI-reference signals (CSI-RSs) on different beams to the UE, and receiving the CSI report from the UE, wherein CSI is based on a precoding matrix according to the configuration information, and the CSI report comprises information on a CSI-RS allowing an expected throughput to have a maximum value among the plurality of CSI-RSs.

In accordance with another aspect of the disclosure, a user equipment (UE) in a wireless communication system is provided. The UE comprises at least one transceiver, and at least one processor functionally coupled to the at least one transceiver, wherein the at least one processor is configured to receive a message comprising configuration information for a channel state information (CSI) report from a base station, receive a plurality of CSI-reference signals (CSI-RSs) on different beams from the base station, generate a precoding matrix for the plurality of CSI-RSs, based on the configuration information, and transmit the CSI report calculated based on the precoding matrix to the base station, wherein the CSI report comprises information on a CSI-RS allowing an expected throughput to have a maximum value among the plurality of CSI-RSs.

In accordance with another aspect of the disclosure, a base station in a wireless communication system is provided. The base station comprises at least one transceiver, and at least one processor functionally coupled to the at least one transceiver, wherein the at least one processor is configured to transmit a message comprising configuration information for a channel state information (CSI) report to a user equipment (UE), transmit a plurality of CSI-reference signals (CSI-RSs) on different beams to the UE, and receive the CSI report from the UE, wherein CSI is based on a precoding matrix according to the configuration information, and the CSI report comprises information on a CSI-RS allowing an expected throughput to have a maximum value among the plurality of CSI-RSs.

Various embodiments of the disclosure provide an apparatus and a method for effectively providing a service in a wireless communication system.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 11 illustrates a method for selecting a precoding weight applied to CSI calculation in a wireless communication system according to an embodiment of the disclosure;

FIG. 15 illustrates configuration information of a superset of CSI-RS resources for grouping a plurality of CSI-RS resource sets in a wireless communication system according to an embodiment of the disclosure;

FIG. 16 illustrates configuration information of an offset parameter for each CSI-RS resource in a wireless communication system according to an embodiment of the disclosure;

FIG. 17 illustrates configuration information of an offset parameter for each CSI-RS resource set in a wireless communication system according to an embodiment of the disclosure;

FIG. 18 illustrates configuration information of a superset of CSI-RS resources in a wireless communication system according to an embodiment of the disclosure;

FIG. 21 illustrates a method for selecting an optimal CSI-RS resource in a wireless communication system according to an embodiment of the disclosure;

FIG. 22 illustrates a method for selecting an optimal CSI-RS resource in a wireless communication system according to an embodiment of the disclosure.

The same reference numerals are used to represent the same elements throughout the drawings.

DETAILED DESCRIPTION

The following description with reference to the accompanying drawings is provided to assist in a comprehensive understanding of various embodiments the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, various embodiments of the disclosure will be described based on an approach of hardware. However, various embodiments of the disclosure include a technology that uses both hardware and software, and thus the various embodiments of the disclosure may not exclude the perspective of software.

In the following description, terms referring to device elements (e.g., control unit, processor, artificial intelligence (AI) model, encoder, decoder, autoencoder (AE), and neural network (NN) model), terms referring to data (e.g., signal, feedback, report, reporting, information, parameter, value, bit, and codeword), and the like are illustratively used for the sake of descriptive convenience. Therefore, the disclosure is not limited by the terms as used below, and other terms having equivalent technical meanings may be used.

In the disclosure, various embodiments will be described using terms employed in some communication standards (e.g., the 3rd generation partnership project (3GPP)), but they are only for the sake of illustration. Various embodiments of the disclosure may also be applied to other communication systems through modifications.

Figure 1:
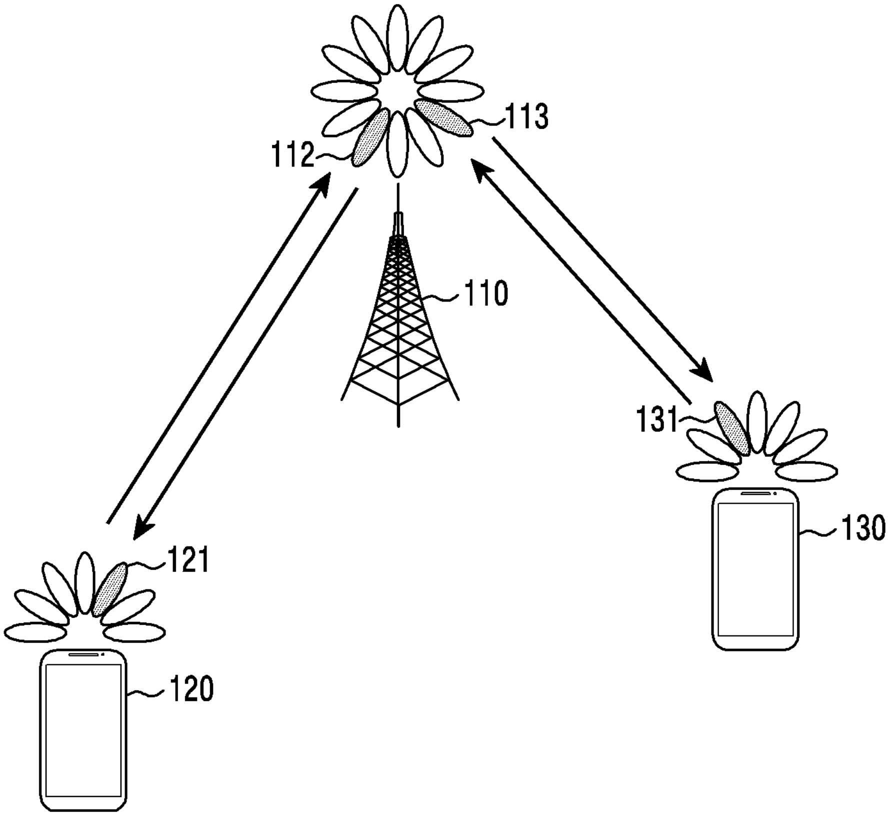
FIG. 1 illustrates an example of a wireless communication environment according to an embodiment of the disclosure.

FIG. 1 illustrates a wireless communication system according to an embodiment of the disclosure.

FIG. 1 illustrates a base station 110, a terminal 120, and a terminal 130 as some of nodes using a wireless channel in a wireless communication system. Although FIG. 1 illustrates only one base station, another base station identical or similar to the base station 110 may be further included.

The base station 110 is a network infrastructure which provides wireless access to the terminals 120 and 130. The base station 110 has coverage defined as a certain geographical area, based on a distance at which a signal can be transmitted. The base station 110 may be referred to as an "access point (AP)", an "eNodeB (eNB)", a "gNodeB (gNB)", a "5th generation node (5G node)", a "6th generation node (6G node)", a "wireless point", a "transmission/reception point (TRP)", or another term having a technical meaning equivalent thereto, in addition to a base station.

Each of the terminal 120 and terminal 130 is a device used by a user and communicates with the base station 110 through a wireless channel. In some cases, at least one of the terminal 120 and the terminal 130 may be operated without user involvement. That is, at least one of the terminal 120 and the terminal 130 is a device which performs machine type communication (MTC) and may not be carried by a user. Each of the terminal 120 and terminal 130 may be referred to as a "user equipment (UE)", a "mobile station", a "subscriber station", a "customer premises equipment (CPE)", a "remote terminal", a "wireless terminal", an "electronic device", a "user device", or another term having a technical meaning similar or equivalent thereto, in addition to a terminal.

The base station 110, the terminal 120, and the terminal 130 may transmit and receive a wireless signal in a mmWave band (e.g., 28 GHz, 30 GHz, 38 GHz, 60 GHz, over 60 GHz, etc.). In this case, in order to improve a channel gain, the base station 110, the terminal 120, and the terminal 130 may perform beamforming. The beamforming may include transmission beamforming and reception beamforming. That is, the base station 110, the terminal 120, and the terminal 130 may give directivity to a transmission signal or a reception signal. To this end, the base station 110 and the terminals 120 and 130 may select serving beams 112, 113, 121 and 131 through a beam search or beam management procedure. After the serving beams 112, 113, 121, and 131 are selected, communication may be performed through a resource having a quasi co-located (QCL) relationship with a resource having transmitted the serving beams 112, 113, 121, and 131.

Figure 2:
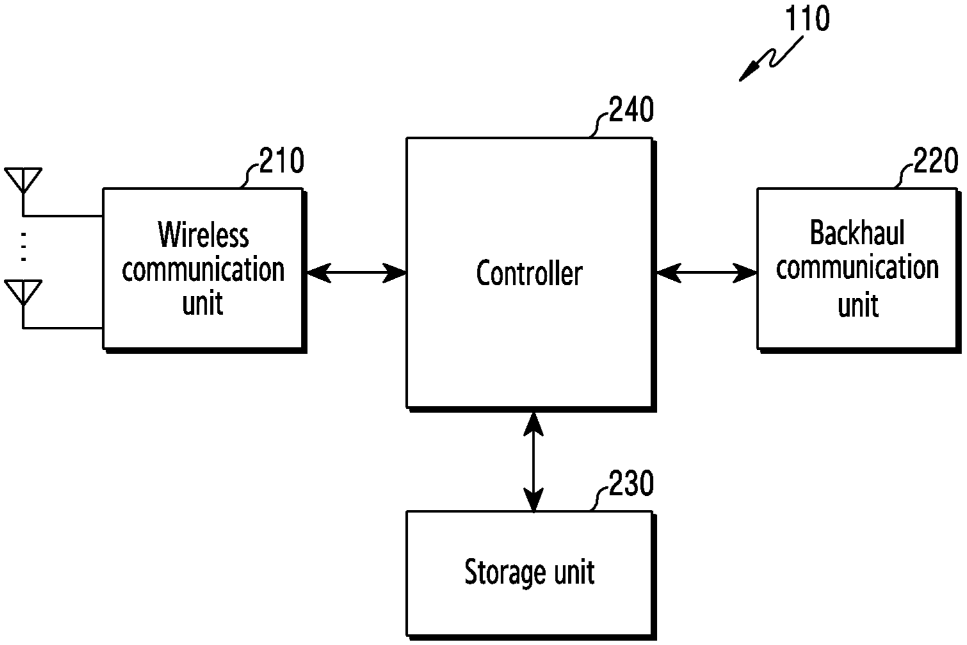
FIG. 2 illustrates an example of a configuration of a base station in a wireless communication system according to an embodiment of the disclosure.

FIG. 2 illustrates an example of a configuration of a base station in a wireless communication system according to an embodiment of the disclosure.

According to various embodiments of the disclosure, the base station 110 may be referred to as a network for convenience. The configuration illustrated in FIG. 2 may be understood as a configuration of the base station 110. Terms such as " . . . unit" and "-er/or" used hereinafter refer to a unit which processes at least one function or operation, and this may be implemented by hardware, software, or a combination of hardware and software.

Referring to FIG. 2, the base station 110 may include a wireless communication unit 210, a backhaul communication unit 220, a storage unit 230, and a controller 240.

The wireless communication unit 210 performs functions for transmitting or receiving a signal through a wireless channel. For example, the wireless communication unit 210 performs a conversion function between a baseband signal and a bit stream according to a physical layer standard of a system. For example, at the time of data transmission, the wireless communication unit 210 generates complex symbols by encoding and modulating transmission bit streams. In addition, at the time of data reception, the wireless communication unit 210 restores a reception bit stream through demodulation and decoding of a baseband signal. In addition, the wireless communication unit 210 up-converts a baseband signal into a radio frequency (RF) band signal and then transmits the RF band signal through an antenna, and down-converts the RF band signal received through the antenna into the baseband signal.

To this end, the wireless communication unit 210 may include a transmission filter, a reception filter, an amplifier, a mixer, an oscillator, a digital to analog convertor (DAC), an analog to digital convertor (ADC), and the like. In addition, the wireless communication unit 210 may include a plurality of transmission/reception paths. Furthermore, the wireless communication unit 210 may include at least one antenna array including a plurality of antenna elements. In terms of hardware, the wireless communication unit 210 may include a digital unit and an analog unit, and the analog unit may include a plurality of sub-units according to an operation power, an operation frequency, etc.

The wireless communication unit 210 may transmit or receive a signal. To this end, the wireless communication unit 210 may include at least one transceiver. For example, the wireless communication unit 210 may transmit a synchronization signal, a reference signal, system information, a message, control information, or data. In addition, the wireless communication unit 210 may perform beamforming.

The wireless communication unit 210 transmits and receives a signal as described above. Accordingly, all or a part of the wireless communication unit 210 may be referred to as a "transmitter", a "receiver", or a "transceiver". In addition, in the following description, transmission and reception performed through a wireless channel refers to the processing described above performed by the wireless communication unit 210.

The backhaul communication unit 220 provides an interface for communicating with other nodes in the network. That is, the backhaul communication unit 220 converts a bit stream transmitted from the base station 110 to another node, for example, another access node, another base station, an upper node, a core network, etc. into a physical signal, and converts a physical signal received from the other node into a bit stream.

The storage unit 230 stores data such as a basic program, an application program, and configuration information for the operation of the base station 110. The storage unit 230 may include a memory. The storage unit 230 may include a volatile memory, a non-volatile memory, or a combination of the volatile memory and the non-volatile memory. In addition, the storage unit 230 may provide stored data according to a request of the controller 240.

The controller 240 controls the overall operations of the base station 110. For example, the controller 240 transmits and receives a signal through the wireless communication unit 210 or the backhaul communication unit 220. In addition, the controller 240 records and reads data on and from the storage unit 230. In addition, the controller 240 may perform functions of a protocol stack required by communication standards. To this end, the controller 240 may include at least one processor.

The configuration of the base station 110 illustrated in FIG. 2 is only an example of a base station, and an example of a base station performing various embodiments of the disclosure is not limited to the configuration illustrated in FIG. 2. That is, according to various embodiments, some configurations may be added, deleted, or changed.

Although the base station is described as one entity in FIG. 2, the disclosure is not limited thereto. A base station according to various embodiments of the disclosure may be implemented to form an access network having a distributed deployment as well as an integrated deployment. According to an embodiment, the base station may be divided into a central unit (CU) and a digital unit (DU) so that the CU may be implemented to perform upper layer functions (e.g., a radio link control (RLC), a packet data convergence protocol (PDCP), and a radio resource control (RRC)) and the DU may be implemented to perform lower layer functions (e.g., a medium access control (MAC) and a physical (PHY)). The DU of the base station may form beam coverage on a wireless channel.

Figure 3:
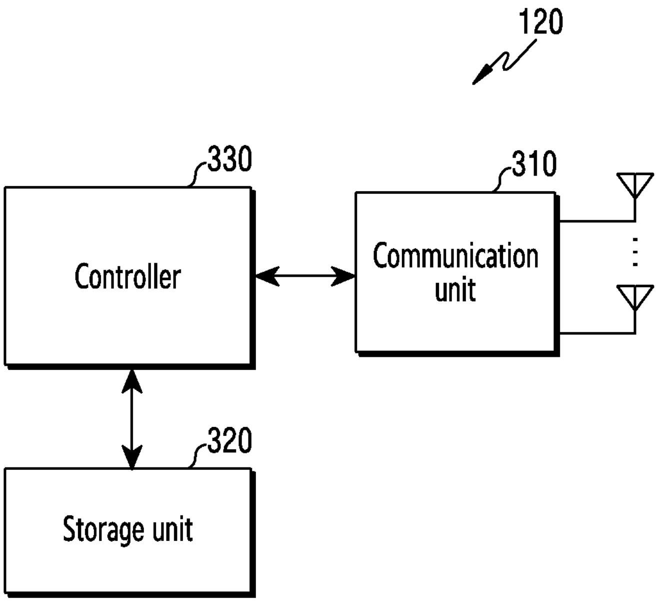
FIG. 3 illustrates an example of a configuration of a terminal in a wireless communication system according to an embodiment of the disclosure.

FIG. 3 illustrates an example of a configuration of a terminal in a wireless communication system according to an embodiment of the disclosure.

The configuration illustrated in FIG. 3 may be understood as the configuration of the terminals 120 and 130. Terms such as "... unit" and "-er/or" used hereinafter may indicate a unit which processes at least one function or operation, and this may be implemented by hardware, software, or a combination of hardware and software.

Referring to FIG. 3, the terminals 120 and 130 may include a communication unit 310, a storage unit 320, and a controller 330.

The communication unit 310 performs functions for transmitting or receiving a signal through a wireless channel. For example, the communication unit 310 performs a conversion function between a baseband signal and a bit stream according to a physical layer standard of a system. For example, at the time of data transmission, the communication unit 310 generates complex symbols by encoding and modulating transmission bit streams. In addition, at the time of data reception, the communication unit 310 restores a reception bit stream through demodulation and decoding of a baseband signal. In addition, the communication unit 310 up-converts a baseband signal into an RF band signal and then transmits the RF band signal through an antenna, and down-converts the RF band signal received through the antenna into the baseband signal. For example, the communication unit 310 may include a transmission filter, a reception filter, an amplifier, a mixer, an oscillator, a DAC, an ADC, and the like.

In addition, the communication unit 310 may include a plurality of transmission/reception paths. Furthermore, the communication unit 310 may include an antenna unit. The communication unit 310 may include at least one antenna array including a plurality of antenna elements. In terms of hardware, the communication unit 310 may include a digital circuit and an analog circuit (e.g., a radio frequency integrated circuit (RFIC)). The digital circuit and the analog circuit may be implemented in one package. In addition, the communication unit 310 may include a plurality of RF chains. The communication unit 310 may perform beamforming. In order to give directivity according to configuration of the controller 330 to a signal to be transmitted or received, the communication unit 310 may apply a beamforming weight to the signal. According to an embodiment, the communication unit 310 may include a radio frequency (RF) block (or RF unit). The RF block may include a first RF circuitry related to an antenna and a second RF circuitry related to baseband processing. The first RF circuitry may be referred to as RF-A (antenna). The second RF circuitry may be referred to as RF-B (baseband).

The communication unit 310 may transmit or receive a signal. To this end, the communication unit 310 may include at least one transceiver. The communication unit 310 may receive a downlink signal. The downlink signal may include a synchronization signal (SS), a reference signal (RS) (e.g., a cell-specific reference signal (CRS) and demodulation (DM)-RS), system information (e.g., master information block (MIB), system information block (SIB), remaining system information (RMSI), and other system information (OSI)), a configuration message, control information, downlink data, or the like. In addition, the communication unit 310 may transmit an uplink signal. The uplink signal may include a random access related signal (e.g., a random access preamble (RAP) (or message 1 (Msg1) or message 3 (Msg3)), a reference signal (e.g., a sounding reference signal (SRS) or DM-RS), or a power headroom report (PHR).

In addition, the communication unit 310 may include different communication modules to process signals of different frequency bands. Furthermore, the communication unit 310 may include a plurality of communication modules to support a plurality of different wireless access technologies. For example, the different wireless access technologies may include Bluetooth low energy (BLE), wireless fidelity (Wi-Fi), Wi-Fi gigabyte (WiGig), a cellular network (e.g., long term evolution (LTE) or new radio (NR)), etc. In addition, the different frequency bands may include a super high frequency (SHF) (e.g., 2.5 GHz and 5 GHz) band and a millimeter wave (e.g., 38 GHz, 60 GHz, etc.) band. In addition, the communication unit 310 may use a wireless access technology in the same manner on different frequency bands (e.g., an unlicensed band for licensed assisted access (LAA), and citizens broadband radio service (CBRS) (e.g., 3.5 GHz)).

The communication unit 310 transmits and receives a signal as described above. Accordingly, all or a part of the communication unit 310 may be referred to as a “transmitter”, a “receiver”, or a “transceiver”. In addition, in the following description, transmission and reception performed through a wireless channel refers to the processing described above performed by the communication unit 310.

The storage unit 320 stores data such as a basic program, an application program, and configuration information for the operation of the terminal 120. The storage unit 320 may include a volatile memory, a non-volatile memory, or a combination of the volatile memory and the non-volatile memory. In addition, the storage unit 320 may provide stored data according to a request of the controller 330.

The controller 330 controls the overall operations of the terminals 120 and 130. For example, the controller 330 transmits and receives a signal through the communication unit 310. In addition, the controller 330 records and reads data on and from the storage unit 320. In addition, the controller 330 may perform functions of a protocol stack required by communication standards. To this end, the controller 330 may include at least one processor. The controller 330 may include at least one processor or microprocessor, or may be a part of the processor. In addition, a part of the communication unit 310 and the controller 330 may be referred to as a cellular processor (CP). The controller 330 may include various modules for performing communication. According to various embodiments, the controller 330 may control the terminal to perform operations according to various embodiments.

Although not shown in FIG. 3, according to various embodiments of the disclosure, the terminals 120 and 130 may further include a CSI selection unit. According to an embodiment, the CSI selection unit included in the terminal may calculate CSI according to the type of precoding scheme received from the base station. In an embodiment, when precoding schemes including a precoding matrix indicator (PMI) are configured in the terminal by higher layer signaling (e.g., an RRC message) received from the base station, the CSI selection unit may calculate CSI, based on a codebook. In this case, the CSI may include a precoding matrix indicator (PMI). In this embodiment, the above-described CSI calculation method may be referred to as a codebook-based CSI calculation method.

In an embodiment, when precoding schemes which do not include a PMI are configured in the terminal by higher layer signaling (e.g., an RRC message) received from the base station, the CSI selection unit may generate a precoding matrix corresponding to one of the configured precoding schemes, and may calculate CSI, based on the generated precoding matrix. In this case, the CSI may include one or more of channel quality indicator (CQI) and rank indication (RI). In this embodiment, the above-described CSI calculation method may be referred to as a non-codebook-based CSI calculation method. In addition, when precoding schemes which do not include a PMI are configured in the terminal (e.g., a non-codebook-based CSI calculation method), a method for generating a precoding matrix corresponding to each precoding scheme may be preconfigured in the base station and the terminal, or the base station may configure the method in the terminal through higher layer signaling (e.g., an RRC message).

In an embodiment, a CSI calculation method according to a precoding scheme may be performed through the controller 330 and the storage unit 320. In this case, the controller 330 may include one or a plurality of processors. The one or plurality of processors may include functions of a general-purpose processor, such as a central processing unit (CPU), an application processor (AP), or a digital signal processor (DSP). The one or plurality of processors may be controlled to calculate CSI according to predefined operation rules stored in the storage unit 320 or information configured by the base station. The CSI selection unit may not be included in the controller 330 and may be included as a separate component.

The configuration of the terminals 120 and 130 illustrated in FIG. 3 is only an example of a terminal, and an example of a terminal performing various embodiments of the disclosure is not limited to the configuration illustrated in FIG. 3. That is, according to various embodiments, some configurations may be added, deleted, or changed.

In this disclosure, a method for comparing performance between CSI-reference signal (CSI-RS) resources having different effective isotropic radiated power (EIRP) and a CSI feedback method may be described. An operation in which the terminal reports information on a channel state (e.g., a measurement result of a channel or beam for transmitting and/or receiving a signal) to the base station may be referred to as CSI feedback or CSI report, and the CSI feedback and the CSI report may have the same meaning. In this case, the EIRP may refer to a value obtained by subtracting cable loss from the sum of transmission power and an antenna gain.

The terminal may compare performance between CSI-RS resources (e.g., CSI-RS resources allocated to an analog beam). In order for the terminal to transmit CSI feedback to the base station based on the performance comparison, different beamforming schemes may be applied to each cell zone. In this case, the CSI-RS resources may have different values of at least one of the port, density, beam width, or intensity of the CSI-RS resources. Each base station may operate analog beamforming and digital beamforming in a hybrid form in order to ensure beam coverage. In this case, a hybrid type of beamforming may be used to maintain beam coverage that is at least the same as a middle band (e.g., 3.5 GHz) in an upper mid-band, which is a band above the middle band (e.g., a band of 10 to 24 GHz, which is an upper mid-band).

In an embodiment, a center zone includes coverage of a close range to the base station, and the base station may ensure coverage through a single analog beam. In this case, in order to ensure coverage through a single analog beam, the number of CSI-RS ports per beam may be increased, and the number of antenna elements per CSI-RS port may be reduced.

In an embodiment, an edge zone includes coverage of a distant range from the base station, and the base station may ensure coverage through a plurality of analog beams. In this case, in order to ensure coverage through a plurality of analog beams, the number of CSI-RS ports per beam may be reduced and the number of antenna elements per CSI-RS port may be increased.

Accordingly, CSI feedback overhead for beam management for each cell zone may be greatly increased. In order to reduce the CSI feedback overhead, the terminal may determine an optimal beam (e.g., a CSI-RS resource) among all CSIs, and transmit only information on the selected optimal CSI-RS resource to the base station. In this case, the terminal may determine an optimal CSI-RS resource among CSI-RS resources having different numbers of CSI-RS ports. Hereinafter, in an embodiment of the disclosure, methods in which a terminal determines an optimal CSI-RS resource among CSI-RS resources having different numbers of CSI-RS ports may be described.

Figure 4:
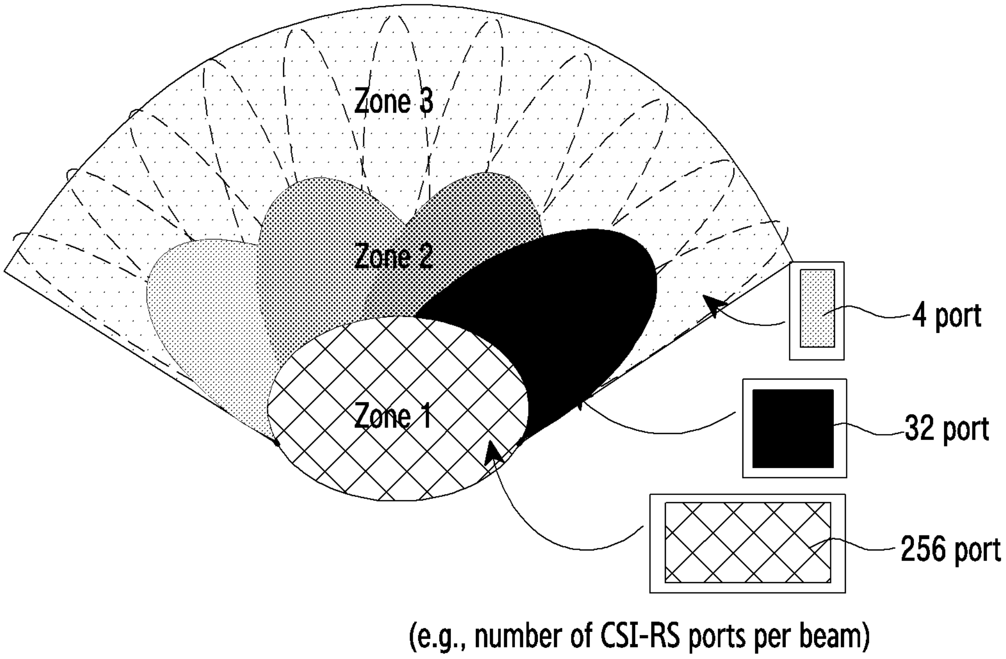
FIG. 4 illustrates a beam sweeping operation according to an embodiment of the disclosure.

FIG. 4 illustrates a beam sweeping operation according to an embodiment of the disclosure.

Referring to FIG. 4, a certain cell may be divided into a first zone (zone 1) to a third zone (zone 3), the first zone may be called a center zone, the second zone may be called a middle zone, and the third zone may be called an edge zone. However, the division of zones for a certain cell is an example in which the terminal transmits a CSI report for each cell zone, and is not limited by this embodiment.

Referring to FIG. 4, different beamforming schemes may be applied to each cell zone in a certain cell. That is, different types of beams (e.g., types of CSI-RS resources) may be used for each cell zone. In an embodiment, coverage of the first zone may be guaranteed through one analog beam, and each beam may include 256 CSI-RS ports. Coverage of the second zone may be guaranteed through a plurality of analog beams, and each beam may include 32 CSI-RS ports. Coverage of the third zone may be guaranteed through a greater number of analog beams than the second zone, and each beam may include four CSI-RS ports. However, the number of CSI-RS ports included in each beam is only an example, and may be more or less than the number of CSI-RS ports per beam described above. In addition, a value of at least one of the density of an analog beam, the width of a beam, or the intensity of a beam may differ depending on a zone.

Further, the base station may perform digital beamforming, based on a precoding matrix (precoding beamforming). When the base station performs analog beamforming through a plurality of antennas, the base station may transmit a beam having a narrow width over a long distance in a specific direction, but it may be difficult to cover the entire cell (or a specific zone of a cell) at once. Therefore, the base station may divide the entire cell (or a specific zone of a cell) coverage into a plurality of zones corresponding to an analog beam width, and turn a beam sequentially to cover the entire cell (or a specific zone) coverage. The above-described operation of the base station may be referred to as beam sweeping.

Figure 5:
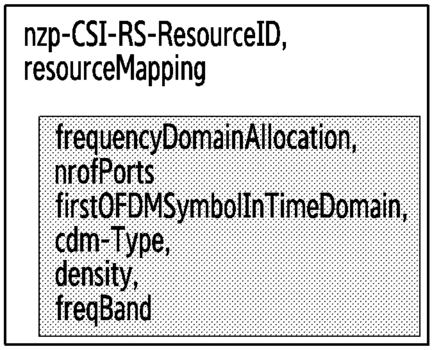
FIG. 5 illustrates various types of channel status information-reference signal (CSI-RS) resources allocated by a base station to a terminal according to an embodiment of the disclosure.

FIG. 5 illustrates various types of CSI-RS resources allocated by a base station to a terminal according to an embodiment of the disclosure.

Referring to FIG. 5, the base station may transmit a CSI-RS to the terminal through different types of CSI-RS resources for each cell zone. In this case, the base station may configure information on CSI-RS resources in the terminal through higher layer signaling (e.g., a radio resource control (RRC) message). The information on CSI-RS resources configured in the terminal may include at least one of frequencyDomainAllocation, nrofPorts, firstOFDMSymbolInTimeDomain, cdm-Type, density, or freqBand. In this case, frequencyDomainAllocation may include frequency domain information to which a CSI-RS resource is allocated, nrofPorts may include information on the number of CSI-RS ports, firstOFDMSymbolInTimeDomain may include time domain information to which a CSI-RS resource is allocated, cdm-Type may include code division multiplexing (CDM) type information of a CSI-RS resource, density may include information on the density of a beam, and freqBand may include information on a frequency band of a CSI-RS resource. EIRPs (e.g., one of frequencyDomainAllocation, nrofPorts, firstOFDMSymbolInTimeDomain, cdm-Type, density, or freqBand) of CSI-RS resources in each zone configured by the base station may be different from each other.

In the above-described embodiment, the operation of configuring configuration information for a CSI report in the terminal through higher layer signaling (e.g., an RRC message) is described, but the terminal may receive configuration information for a CSI report from the base station through at least one of higher layer signaling (e.g., an RRC message), MAC layer signaling (e.g., MAC control element (CE)), or control information (e.g., downlink control information (DCI)). In the following embodiments of the disclosure, configuration information may also be configured in or indicated to the terminal.

Figure 6:
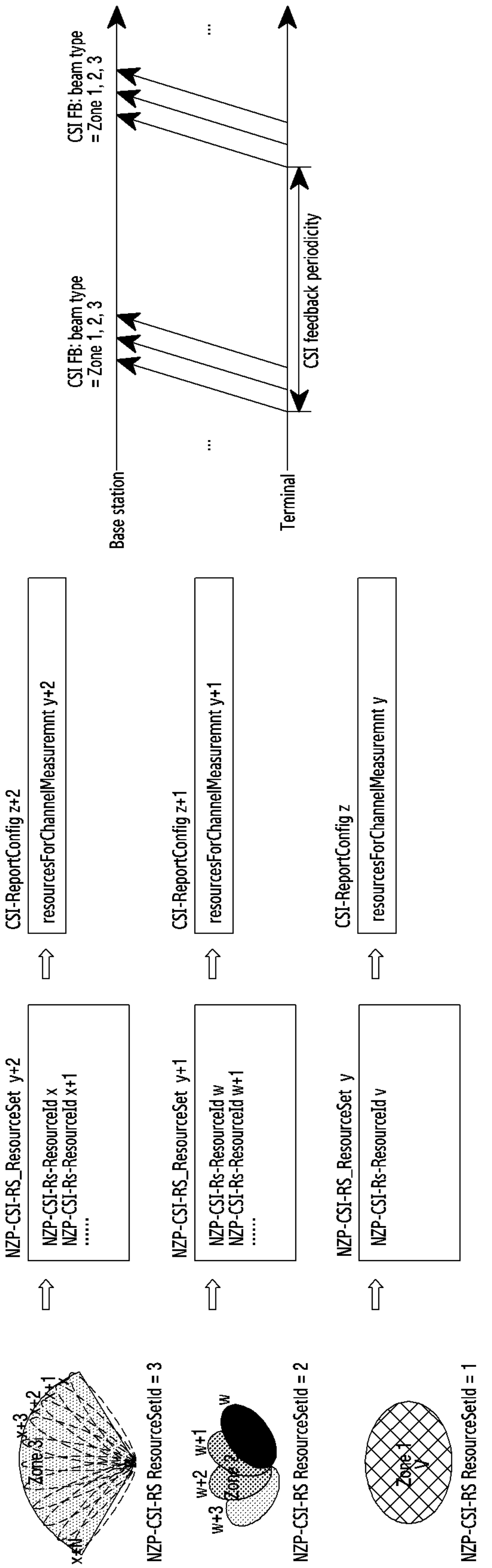
FIG. 6 illustrates a method for configuring a set of CSI-RS resources according to an embodiment of the disclosure.

FIG. 6 illustrates a method for configuring a set of CSI-RS resources according to an embodiment of the disclosure.

Referring to FIG. 6, the base station may configure a CSI-RS set including a plurality of CSI-RS resources in order to select (determine or identify) an optimal CSI-RS resource for each cell zone. The base station may configure a CSI-RS set for each cell zone by using a method for configuring a CSI-RS set.

In an embodiment, the base station may configure a CSI-RS resource set identity (ID) (e.g., NZP-CSI-RS-ResourceSetId) for each of the first to third zones. NZP-CSI-RS-ResourceSetId of the first zone may be configured to be 1. Since the first zone may be covered by one analog beam, a CSI-RS resource set (e.g., NZP-CSI-RS-ResourceSet y) of the first zone may include one CSI-RS resource ID (e.g., NZP-CSI-RS-ResourceId={v}). Further, NZP-CSI-RS-ResourceSetId of the second zone may be configured to be 2.

Since the second zone may be covered by a plurality of analog beams, a CSI-RS resource set (e.g., NZP-CSI-RS-ResourceSet y+1) of the second zone may include a plurality of CSI-RS resource IDs (e.g., NZP-CSI-RS-ResourceId={w, w+1, w+2, w+3}). In addition, NZP-CSI-RS-ResourceSetId of the third zone may be configured to be 3. Since the third zone may be covered by a larger number of analog beams than the second zone, a CSI-RS resource set (e.g., NZP-CSI-RS-ResourceSet y+2) of the third zone may include a plurality of CSI-RS resource IDs (e.g., NZP-CSI-RS-ResourceId={x, x+1, . . . , x+N}). In this case, N may refer to the number of emitted analog beams, which corresponds to a value of beam coverage.

In addition, the base station may configure, in the terminal, information on an uplink resource for the terminal to transmit a CSI report, through higher layer signaling (e.g., an RRC message). In an embodiment, a CSI report resource (e.g., CSI-ReportConfig z) for a CSI-RS in the first zone and a resource (e.g., resourcesForChannelMeasurement y) for channel measurement may be configured in the terminal. Further, a CSI report resource (e.g., CSI-ReportConfig z+1) for a CSI-RS in the second zone and a resource (e.g., resourcesForChannelMeasurement y+1) for channel measurement may be configured in the terminal. In addition, a CSI report resource (e.g., CSI-ReportConfig z+2) for a CSI-RS in the third zone and a resource (e.g., resourcesForChannelMeasurement y+2) for channel measurement may be configured in the terminal.

In this case, the terminal is required to transmit a CSI report to the base station for each CSI-RS resource set. Therefore, uplink overhead may occur due to the terminal's CSI report. Further, the above-described embodiment illustrates a method in which a base station configures a CSI-RS resource set by using beams of the same type for each cell zone, but a CSI-RS resource set may not be limited to being configured only by beams of the same type. However, when the base station configures a CSI-RS resource set by using beams of the same type, the number of CSI reports by the terminal may be reduced compared to the case where the CSI-RS resource set includes beams of different types. Therefore, when the base station configures a CSI-RS resource set by using beams of the same type, an effect of reducing uplink overhead may be increased. In this case, the beams of the same type may refer to CSI-RS resources having the same bandwidth part (BWP) ID, density, and nrofPorts, excluding CSI-RS resources used for interference measurement.

In FIG. 6, a procedure in which the terminal periodically transmits a CSI report to the base station is shown, but the above-described embodiment may not be limited to a periodic CSI report procedure. The base station may configure configuration information related to aperiodic CSI reporting in the terminal through an RRC message. The terminal may aperiodically transmit a CSI report to the base station, based on the configuration information. The terminal's operation of periodic or aperiodic CSI reporting may be preconfigured in the terminal through an RRC message. Each operation for CSI reporting according to various embodiments of the disclosure may be applied to various CSI report cases between the terminal and the base station to the extent that a person skilled in the art may clearly understand. In addition, various embodiments of the disclosure may include at least one of all, some, or combinations of some of operations described hereinafter, and in the implementable extent, combinations of some of the operations for periodic, semi-periodic, or semi-persistent CSI reporting are possible.

Hereinafter, operations for CSI reporting, including all of the flows of signals for periodic, aperiodic, and semi-persistent CSI reporting, are described.

Hereinafter, a method in which a terminal transmits a CSI report to a base station may be described in relation to the disclosure. The base station may receive, from the terminal, a CSI report based on a CSI-RS transmitted to the terminal. The base station may identify a channel state between the base station and the terminal through the CSI report, and determine (or select) an optimal beam which maximizes a throughput. Specifically, the base station may determine an optimal beam, based on at least one of a channel quality indicator (CQI), a precoding matrix indicator (PMI), or a rank indicator (RI) included in the CSI report. In this case, the terminal may estimate (measure or calculate) a CQI, based on a PMI. Specifically, the terminal may select the PMI, based on a codebook received from the base station according to an RI, and calculate a signal to interference plus noise ratio (SINR), based on the PMI. Further, the terminal may determine the CQI, based on the calculated signal to interference plus noise ratio (SINR). The PMI-based CQI determination method described above may be an operation of a codebook-based CSI report method. PMI-based or synchronization signal block (SSB) resource indicator (SSBRI)-based beamforming may be used for a codebook-based CSI report.

Both the PMI-based beamforming and sounding reference signal (SRS) (or transmit antenna selection (TAS))-based beamforming may be used for each cell zone. The SRS-based beamforming may have a greater gain than that of the PMI-based beamforming. However, since an SRS is a reference signal transmitted from the terminal to the base station, there may be a limitation (for example, terminal power limitation) compared to the PMI-based beamforming. Therefore, a beamforming scheme expected for downlink transmission may vary for each cell zone. In particular, in an upper mid-band, coverage of an SRS may be limited according to transmission power and path loss. An expected beamforming scheme for each cell zone may be classified as shown in Table 1 below.

TABLE 1

| Zone | Expected beamforming scheme for downlink transmission |
|---|---|
| 1 | based on SRS(TAS) |
| 2 | based on SRS (TAS) and/or based on PMI |
| 3 | based on PMI and/or based on SSBRI |

In an embodiment, referring again to FIG. 4, since the terminals closest to the base station exist in the first zone, there may be a fewer limitation affecting the SRS-based beamforming. Therefore, the base station may use the SRS-based beamforming with respect to the first zone. In addition, since the distance between the terminal and the base station in the second zone is relatively longer compared to the first zone, the SRS-based beamforming and/or the PMI-based beamforming may be used. Further, since the terminal is located at a cell edge in the third zone, the base station may use the PMI-based beamforming and/or SSBRI-based beamforming. However, since the terminal is not aware of a transmission precoding weight generated by zero forcing (ZF) or singular value decomposition (SVD) precoding, the CQI estimated (or calculated) by the terminal may be difficult to reflect the gain of the SRS-based beamforming.

Figure 7:
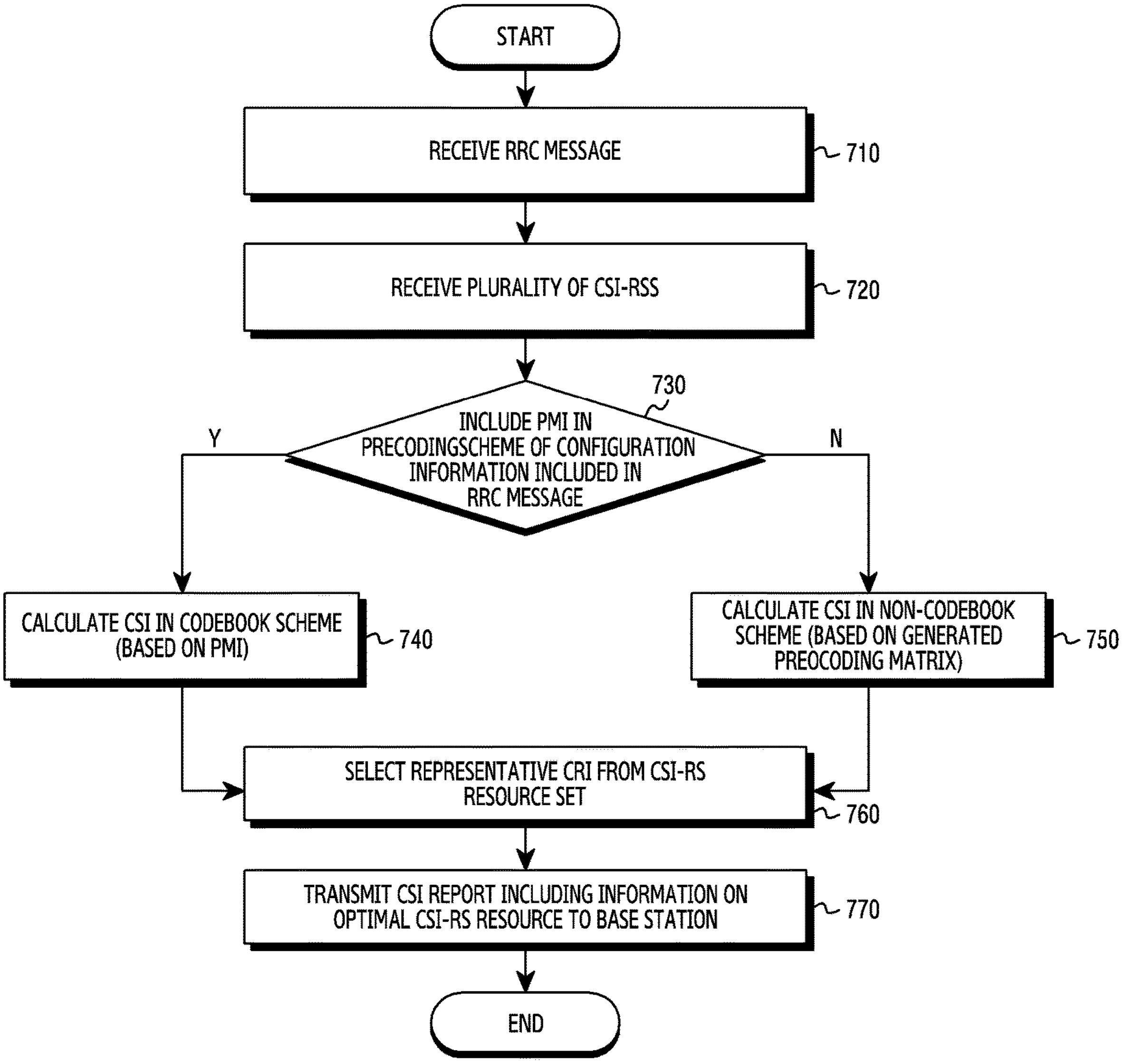
FIG. 7 illustrates the order of a CSI report operation including information on an optimal CSI-RS resource in a wireless communication system according to an embodiment of the disclosure.

FIG. 7 illustrates the order of a CSI report operation including information on an optimal CSI-RS resource in a wireless communication system according to an embodiment of the disclosure.

Referring to FIG. 7, the terminal may select (decide or identify) an optimal CSI-RS resource to reduce uplink overhead, and may transmit a CSI report including information on the selected optimal CSI-RS resource to the base station.

In operation 710, the terminal may receive a higher layer message (e.g., an RRC message) from the base station. The RRC message may include information on a CSI-RS resource and a CSI report resource.

In operation 720, the terminal may receive a plurality of CSI-RSs, based on configuration information received from the base station. The plurality of CSI-RSs received by the terminal may be included in one CSI-RS resource set. Alternatively, the plurality of CSI-RS s received by the terminal may be included in a plurality of CSI-RS resource sets, and the plurality of CSI-RS resource sets may refer to CSI-RS resource sets for each cell zone in the embodiment of FIG. 5.

In operation 730, the terminal may determine a method for calculating CSI according to a precoding scheme (e.g., precodingScheme) included in the RRC message received from the base station. In this case, one or more precoding schemes configured in the terminal may be included, and will be described in detail in FIG. 11 below.

In operation 740, when a precoding scheme included in the RRC message includes a PMI, the terminal may calculate CSI by using a codebook scheme (e.g., a CQI calculation method based on a PMI). The CSI calculation method in the codebook scheme may be a method for calculating a CQI based on a codebook received from a base station, and may be the same method as the CQI calculation method described in the embodiment of FIG. 6.

In operation 750, in an embodiment, when the precoding scheme included in the RRC message does not include the PMI, the terminal may calculate CSI by using a non-codebook scheme (e.g., a CQI calculation method not based on a PMI). The non-codebook scheme may be a method in which a terminal may generate a precoding matrix corresponding to a precoding scheme other than a PMI and generate a CQI, based on the generated precoding matrix. Therefore, the non-codebook scheme may be different from the CQI calculation method described in the embodiment of FIG. 6. In this case, the base station may preconfigure, in the terminal, a method for generating a precoding matrix corresponding to a precoding scheme (e.g., a method of preconfiguring the method in a terminal through an RRC message).

In an embodiment, although not shown in FIG. 7, the terminal may transmit UE capability information to the base station. The base station may configure to transmit UE capability information to the terminal through an RRC message or MAC control element (CE), and may preconfigure a CSI calculation procedure in the terminal, based on the UE capability information transmitted by the terminal based on the configuration information.

The terminal may select (or decide) a CSI calculation method according to the type of precoding scheme included in the RRC message received from the base station. Therefore, when the precoding scheme includes the PMI, the terminal may decide to calculate CSI by using the codebook scheme. When the precoding scheme does not include the PMI, the terminal may decide to calculate CSI by using the non-codebook scheme. However, even when the precoding scheme includes the PMI, the terminal may decide to calculate CSI by using the codebook scheme depending on capability of the terminal.

In operation 760, the terminal may select a representative CSI-RS resource indicator (CRI) from the CSI-RS resource set. The representative CRI may indicate a beam (e.g., a CSI-RS resource) preferred by the terminal in each CSI-RS resource set. Alternatively, the representative CRI may indicate at least one CSI-RS resource having the best channel state among CSI-RS resources included in each CSI-RS resource set.

In operation 770, the terminal may transmit, to the base station, a CSI report including information (e.g., one CSI-RS resource having the best channel state among one or more CSI-RS resources indicated by the representative CRI) on an optimal CSI-RS resource.

Figure 8:
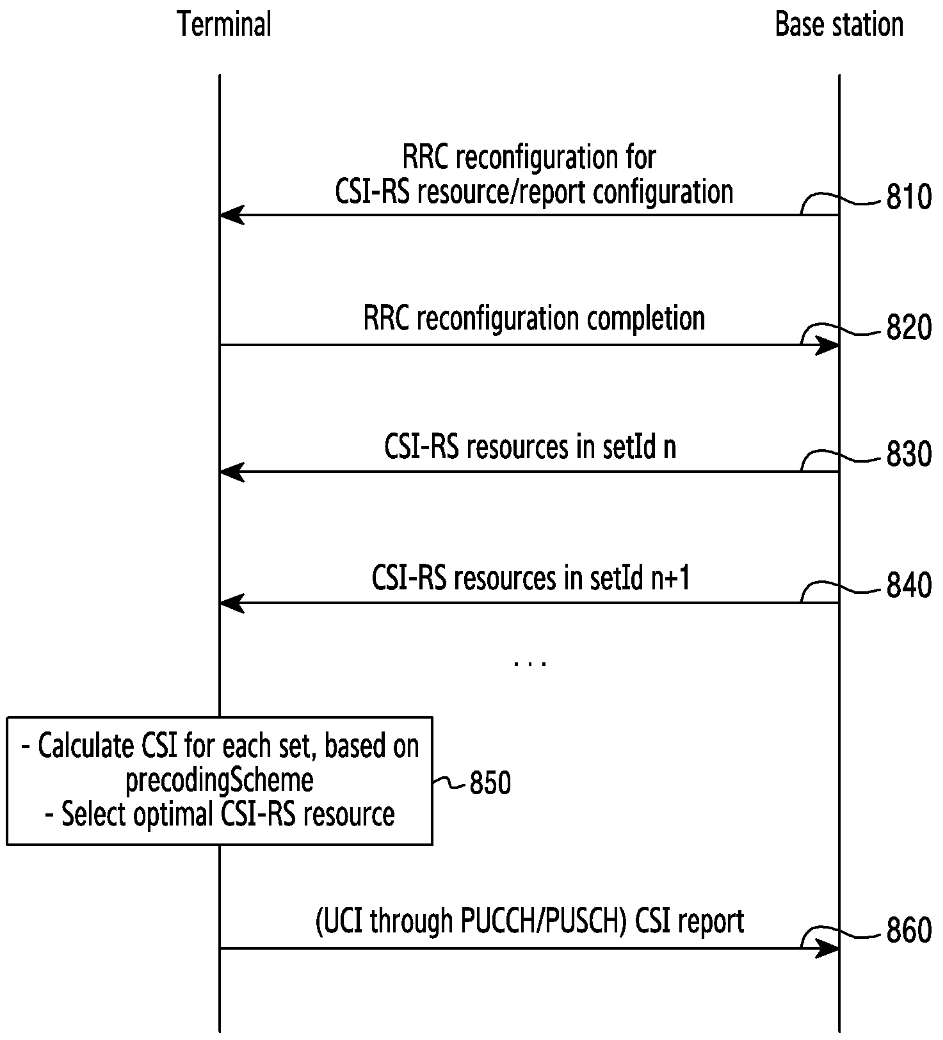
FIG. 8 illustrates the flow of a signal for a CSI report including information on an optimal CSI-RS resource in a wireless communication system according to an embodiment of the disclosure.

FIG. 8 illustrates the flow of a signal for a CSI report including information on an optimal CSI-RS resource in a wireless communication system according to an embodiment of the disclosure.

Referring to FIG. 8, the flow of a signal between the base station and the terminal in the CSI report procedure of the terminal in FIG. 7 may be described.

In operation 810, the base station may transmit, to the terminal, an RRC message (e.g., an RRC reconfiguration message) including configuration information for a CSI-RS and a CSI report.

In operation 820, the terminal may transmit an RRC reconfiguring completion message (e.g., an acknowledge (ACK) signal) to the base station in response to the RRC reconfiguration message.

In operations 830 and 840, the base station may sequentially transmit CSI-RSs to the terminal through CSI-RS resources for each CSI-RS resource set ID, based on the configuration information included in the RRC reconfiguration message. Alternatively, the base station may non-sequentially transmit CSI-RSs to the terminal through CSI-RS resources for each CSI-RS resource set ID, based on the configuration information included in the RRC reconfiguration message received in operation 810. In this case, a method for transmitting CSI-RSs (e.g., sequential or non-sequential transmission) may be preconfigured in the terminal by the RRC reconfiguration message received from the base station in operation 810.

In operation 850, the terminal may calculate CSI for each CSI-RS resource set, based on a precoding scheme included in the RRC reconfiguration message received from the base station. Further, the terminal may select an optimal CSI-RS resource, and the optimal CSI-RS resource may be a CSI-RS resource corresponding to one CRI among CRIs representing respective CSI-RS resource sets.

In operation 860, the terminal may transmit a CSI report including channel state information (e.g., information on a channel corresponding to the optimal CSI-RS resource selected by the terminal in operation 850) to the base station on a physical uplink control channel (PUCCH) or a physical uplink shared channel (PUSCH) through uplink control information (UCI).

Figure 9:
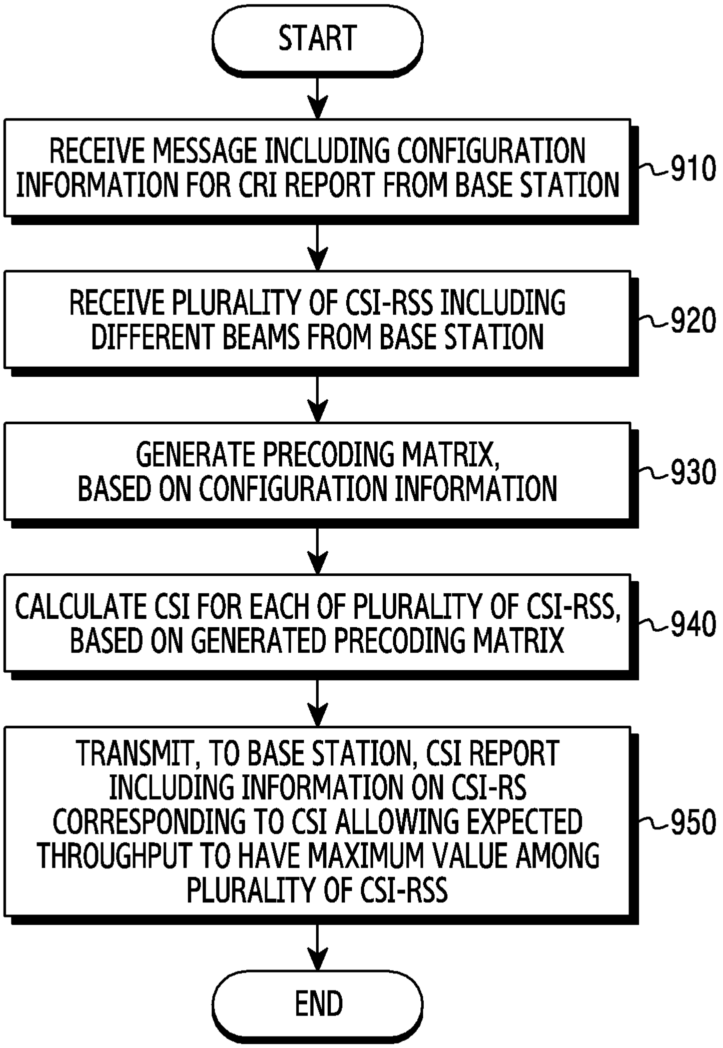
FIG. 9 illustrates the order of CSI reports including information on an optimal CSI-RS resource in a wireless communication system according to an embodiment of the disclosure.

FIG. 9 illustrates the order of CSI reports including information on an optimal CSI-RS resource in a wireless communication system according to an embodiment of the disclosure.

Referring to FIG. 9, a CSI report operation based on a non-codebook scheme of the terminal may be described. A CSI report based on the non-codebook scheme described in this embodiment may follow an embodiment of FIG. 7 (e.g., a method including operation 750). Accordingly, a description overlapping with that of FIG. 7 may be omitted below.

In operation 910, the terminal may receive an RRC message (e.g., an RRC reconfiguration message) including configuration information for transmitting a representative CRI to the base station. The RRC message may include information on a CSI-RS resource and a CSI report resource.

In operation 920, the terminal may receive a plurality of CSI-RSs, based on the configuration information received from the base station. The plurality of CSI-RSs received by the terminal may be transmitted through CSI-RS resources included in one or more CSI-RS resource sets.

In operation 930, when a precoding scheme included in the configuration information received from the base station includes a PMI, and UE capability is greater than or equal to a threshold value of UE capability which may generate a precoding matrix, the terminal may determine to calculate CSI, based on the non-codebook scheme. In this case, it may be assumed that the terminal is aware of a channel matrix $H \in \mathbb{C}^{N_t \times Nr}$ received through a CSI-RS. A precoding matrix generation method may vary depending on the type of precoding scheme included in the configuration information. Specifically, if the precoding scheme is ZF, a precoding matrix may be calculated as W=H(HTH)−1. Alternatively, if the precoding scheme is regularized ZF, the precoding matrix may be calculated as W=H(HTH+αI)−1 (α:scalar value to regularize HTH). The above-described methods are merely examples of methods for generating a precoding matrix according to the type of precoding scheme, and there may be other methods than the above-described calculation formula. In addition, a precoding matrix generation method may vary depending on the type of precoding scheme included in the configuration information. In this case, the threshold value of the UE capability may refer to calculation capability per hour, the size of available storage space, etc. In addition, only a case where UE capability is greater than or equal to the threshold value is not necessarily included, and a case where UE capability exceeds the threshold value may also be included.

In operation 940, the terminal may calculate an SINR for each rank, based on the precoding matrix generated in operation 930, and determine (select or identify) a rank and CQI with a maximum throughput among the calculated SINRs.

In operation 950, the terminal may transmit, to the base station, a CSI report including information (or information on a representative CRI) on a CSI-RS resource corresponding to the rank and CQI determined in operation 940. Accordingly, the terminal may receive a downlink signal from the base station through a channel determined based on the CSI report.

Figure 10:
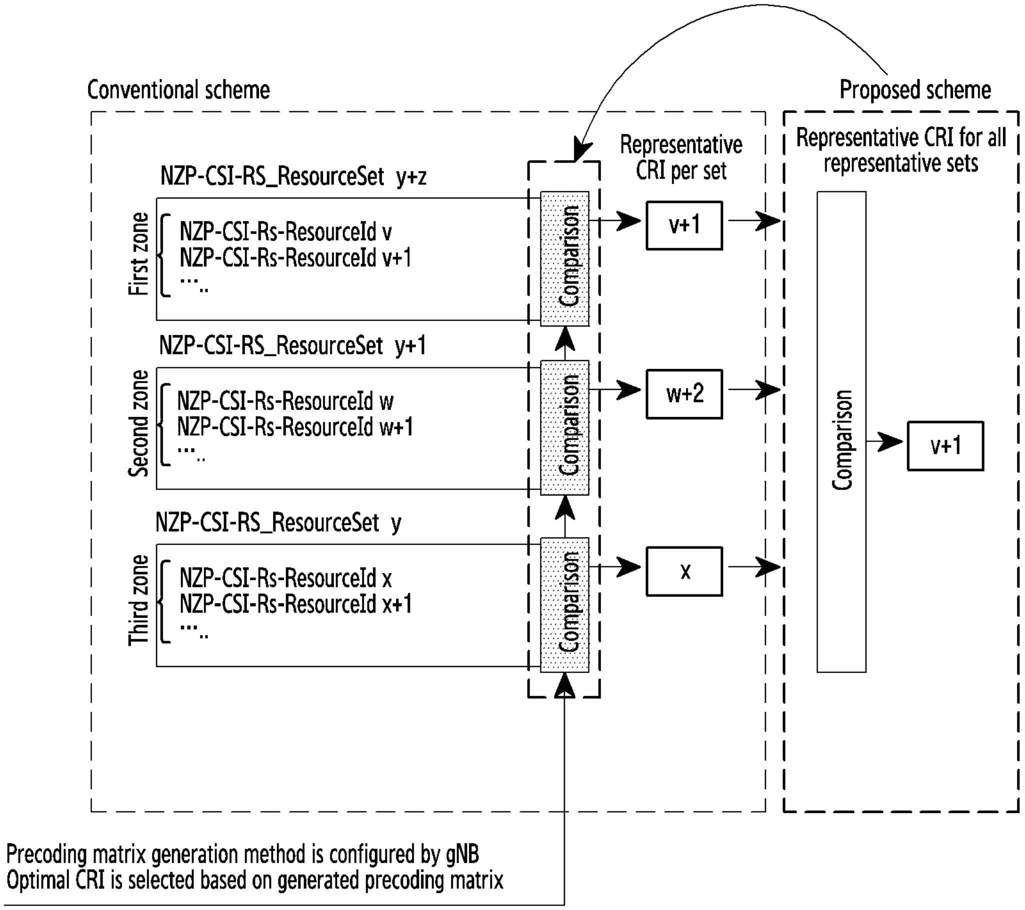
FIG. 10 illustrates a method for determining a representative CSI-RS resource indicator (CRI) for each CSI-RS resource set in a wireless communication system according to an embodiment of the disclosure.

FIG. 10 illustrates a method for determining a representative CRI for each CSI-RS resource set in a wireless communication system according to an embodiment of the disclosure.

Referring to FIG. 10, in a CSI report method based on the non-codebook scheme according to the embodiment of FIG. 9 described above, the terminal may select a representative CRI, based on a precoding matrix generated based on configuration information.

In an embodiment, the terminal may calculate CSI for each CSI-RS resource set (e.g., CSI-RS resource sets y, y+1, and y+2 configured for each cell zone in FIG. 6), based on the generated precoding matrix, and select, as a representative CRI, a CRI indicating a CSI-RS having an optimal channel state from the calculated CSI. In an embodiment, the terminal may select CSI-RS resources having IDs of x, w+2, and v+1 as a representative CRI for each cell zone, and select a CRI indicating one (e.g., a CSI-RS resource having an ID of v+1) among the selected CSI-RS resources as a representative CRI for all representative sets. The selection of the representative CRI described above may have the same meaning as selection of a CSI-RS resource which maximizes an expected throughput (e.g., which means the product of spectral efficiency and a rank).

In an embodiment, the terminal may select CRIs of up to M CSI-RS resources (e.g., M<N, where N is the maximum number of representative CRIs to be selected by the terminal) for each CSI-RS resource set. For example, in the case where N=4, M=2, if optimal CRIs of the first and second priorities are selected for a certain CSI-RS resource set, an optimal CRI of the third priority may be selected from a CSI-RS resource set other than the CSI-RS resource set in which the optimal CRIs of the first and second priorities are selected.

The optimal number of CRIs that the terminal may select from the CSI-RS resource sets configured in the terminal by the base station may not necessarily be limited to one. The terminal may select one or more optimal CRIs from only one CSI-RS resource set, and may not select an optimal CRI from another CSI-RS resource set. The above-described optimal CRI selection method of the terminal may be preconfigured through an RRC message (e.g., an RRC reconfiguration message) received from the base station.

FIG. 11 illustrates a method for selecting a precoding weight applied to CSI calculation in a wireless communication system according to an embodiment of the disclosure.

Referring to FIG. 11, in the CSI report method based on the non-codebook scheme according to the embodiment of FIG. 9 described above, configuration information for a CSI report which is configured in the terminal by the base station through an RRC message (e.g., an RRC reconfiguration message) may include information on a precoding scheme. The configuration information may include one or more precoding schemes in the form of "ENUMERATED". However, in the configuration information, one or more precoding schemes may be configured in the form of "CHOICE" and are not limited to the form of "ENUMERATED" or "CHOICE". The type of precoding scheme may include at least one of a PMI, ZF, regularized ZF, or a minimum mean square error (MMSE).

Figure 12:
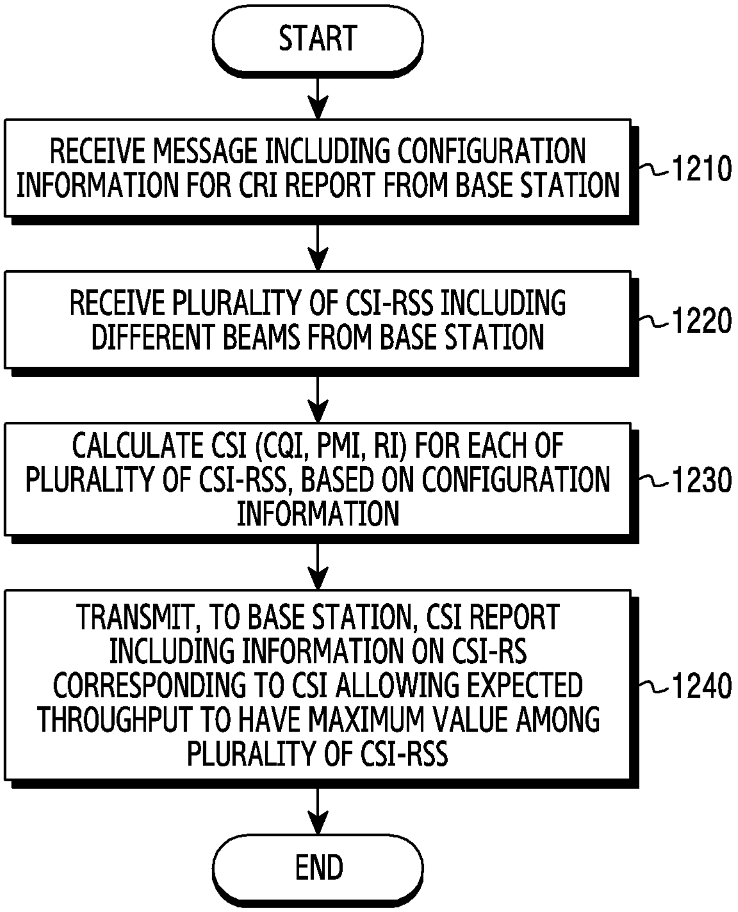
FIG. 12 illustrates the order of CSI reports including information on an optimal CSI-RS resource in a wireless communication system according to an embodiment of the disclosure.

FIG. 12 illustrates the order of CSI reports including information on an optimal CSI-RS resource in a wireless communication system according to an embodiment of the disclosure.

Referring to FIG. 12, a CSI report operation based on a codebook scheme of the terminal may be described. A CSI report based on the codebook scheme described in this embodiment may follow an embodiment of FIG. 7 (e.g., a method including operation 740). Accordingly, a description overlapping with that of FIG. 7 may be omitted below.

In operation 1210, the terminal may receive an RRC message (e.g., an RRC reconfiguration message) including configuration information for transmitting a representative CRI to the base station. The RRC message may include information on a CSI-RS resource and a CSI report resource.

In operation 1220, the terminal may receive a plurality of CSI-RSs, based on the configuration information received from the base station. The plurality of CSI-RSs received by the terminal may refer to CSI-RSs transmitted through CSI-RS resources included in one or more CSI-RS resource sets.

In operation 1230, when a precoding scheme included in the configuration information received from the base station does not include a PMI, or when UE capability is less than or equal to a threshold value of UE capability which may generate a precoding matrix even if the precoding scheme includes the PMI, the terminal may determine to calculate CSI, based on the codebook scheme. The terminal may calculate CSI for each of CSI-RSs by using the codebook scheme. In an embodiment, a CSI calculation method using the codebook scheme may be the same as the embodiment of FIG. 6 described above. In this case, the threshold value of the UE capability may refer to calculation capability per hour, the size of available storage space, etc. In addition, only a case where UE capability is less than or equal to the threshold value is not necessarily included, and a case where UE capability is less than the threshold value may also be included.

In operation 1240, in an embodiment, the terminal may select a representative CRI indicating a CSI-RS which maximizes an expected throughput, based on the CSI calculated in operation 1230. In this case, the terminal may consider an offset of a CQI, a reference signal received power (RSRP), or other key performance indicators (KPIs) when calculating the expected throughput. The offset may be determined in consideration of the number of ports of CSI-RS resources representing each CSI-RS resource set.

In an embodiment, the terminal may consider performance metric (e.g., an RSRP) other than an expected throughput. Therefore, the terminal may select a representative CRI indicating a CSI-RS which maximizes an RSRP.

The terminal may transmit a CSI report including information on the selected representative CRI to the base station. Accordingly, the terminal may receive a downlink signal from the base station through a channel determined based on the CSI report.

Figure 13:
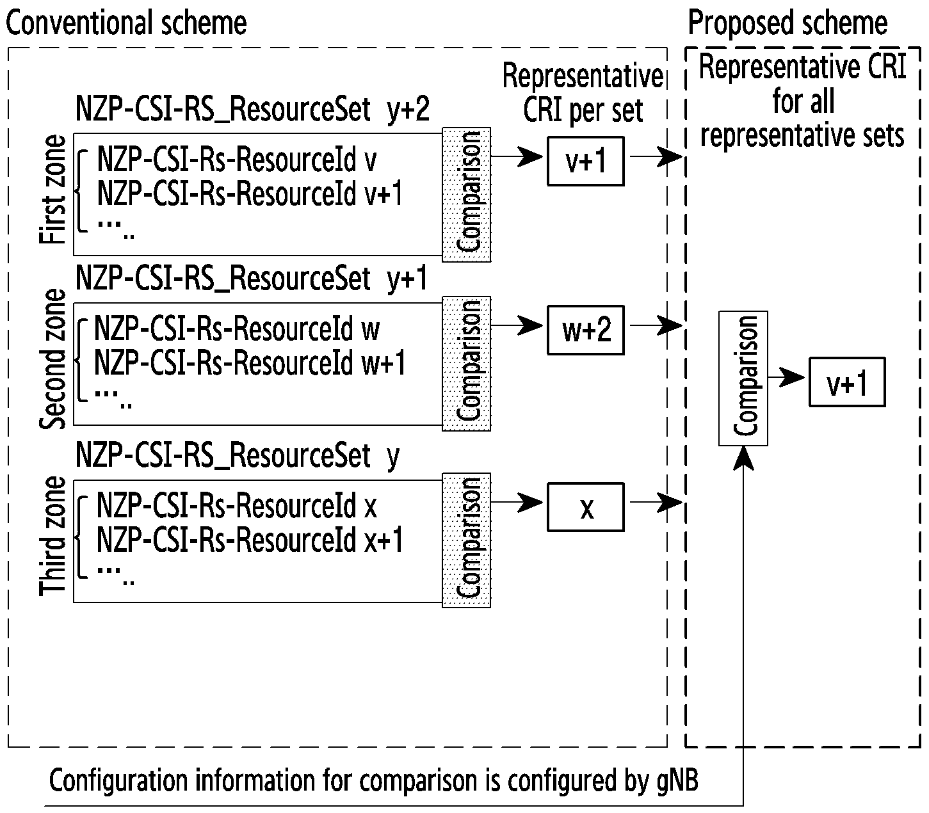
FIG. 13 illustrates a method for determining a representative CRI for each CSI-RS resource set in a wireless communication system according to an embodiment of the disclosure.

FIG. 13 illustrates a method for determining a representative CRI for each CSI-RS resource set in a wireless communication system according to an embodiment of the disclosure.

Referring to FIG. 13, in a CSI report method based on the codebook scheme according to the embodiment of FIG. 12 described above, the terminal may select a representative CRI, based on a PMI.

In an embodiment, the terminal may calculate CSI for each CSI-RS resource set (e.g., CSI-RS resource sets y, y+1, and y+2 configured for each cell zone in FIG. 6), based on the PMI, and select, as a representative CRI, a CRI indicating a CSI-RS having an optimal channel state from the calculated CSI. In this case, all CSI-RS resources included in one CSI-RS resource set may have the same number of CSI-RS ports. Further, each CSI-RS resource set may have a different (or the same) number of CSI-RS ports. In an embodiment, the terminal may select CSI-RS resources having IDs of x, w+2, and v+1 as a representative CRI for each cell zone, and select a CRI indicating one (e.g., a CSI-RS resource having an ID of v+1) among the selected CSI-RS resources as a representative CRI for all representative sets. The selection of the representative CRI described above may have the same meaning as selection of a CSI-RS resource which maximizes an expected throughput (e.g., which means the product of spectral efficiency and a rank value).

In an embodiment, the terminal may select CRIs of up to M CSI-RS resources (e.g., M<N, where N is the maximum number of representative CRIs to be selected by the terminal) for each CSI-RS resource set. For example, in the case where N=4, M=2, if optimal CRIs of the first and second priorities are selected for a certain CSI-RS resource set, an optimal CRI of the third priority may be selected from a CSI-RS resource set other than the CSI-RS resource set in which the optimal CRIs of the first and second priorities are selected.

The optimal number of CRIs that the terminal may select from the CSI-RS resource sets configured in the terminal by the base station may not necessarily be limited to one. The terminal may select one or more optimal CRIs from only one CSI-RS resource set, and may not select an optimal CRI from another CSI-RS resource set. The above-described optimal CRI selection method of the terminal may be preconfigured through an RRC message (e.g., an RRC reconfiguration message) received from the base station.

Figure 14:
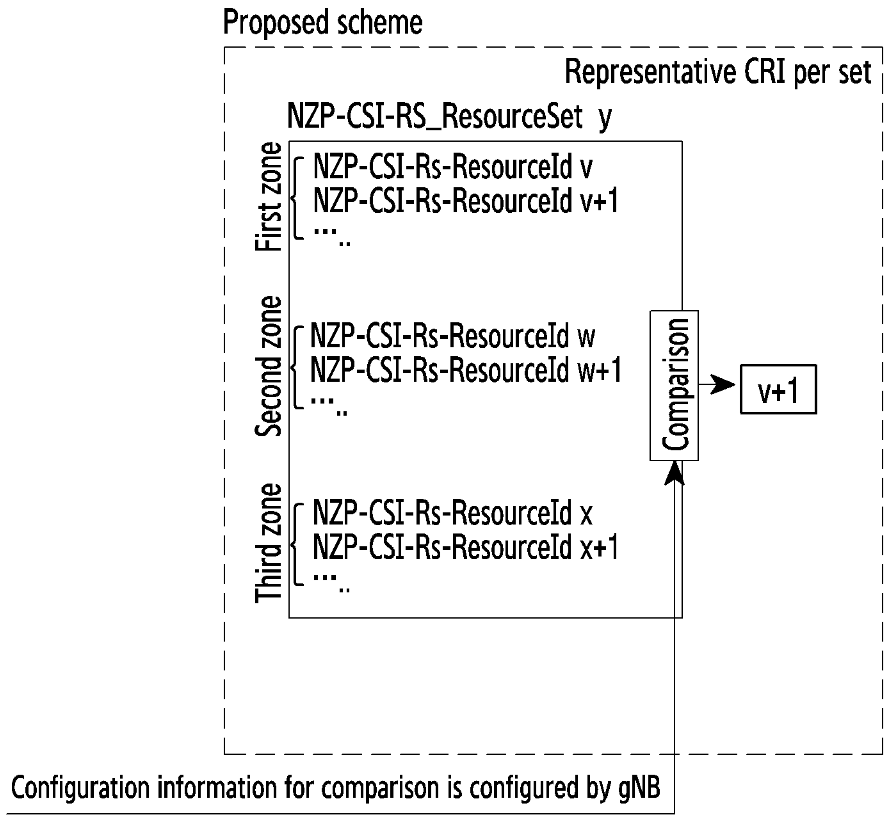
FIG. 14 illustrates a method for determining a representative CRI for each CSI-RS resource set in a wireless communication system according to an embodiment of the disclosure.

FIG. 14 illustrates a method for determining a representative CRI for each CSI-RS resource set in a wireless communication system according to an embodiment of the disclosure.

Referring to FIG. 14, in the CSI report method based on the codebook scheme according to the embodiment of FIG. 12 described above, the terminal may select a representative CRI, based on a PMI. Specifically, unlike the method for configuring a CSI-RS resource set for each cell zone in FIG. 6, the terminal may configure a CSI-RS resource set including all CSI-RS resources. Therefore, the terminal may select, as a representative CRI, a CRI indicating a CSI-RS having an optimal channel state from the CSI-RS resource set including all the CSI-RS resources, based on the PMI. In this case, each of the CSI-RS resources included in the CSI-RS resource set may have a different number of CSI-RS ports. In an embodiment, the terminal may select, as the representative CRI, a CRI indicating one (e.g., a CSI-RS resource having an ID of v+1) of all the CSI-RS resources. The selection of the representative CRI described above may have the same meaning as selection of a CSI-RS resource which maximizes an expected throughput (e.g., which means the product of spectral efficiency and a rank value).

FIG. 15 illustrates configuration information of a superset of CSI-RS resources for grouping a plurality of CSI-RS resource sets in a wireless communication system according to an embodiment of the disclosure.

Referring to FIG. 15, in relation to the CSI calculation method based on the non-codebook scheme of FIG. 8 described above, a method capable of saving a resource used by the terminal to select a representative CRI for each CSI-RS resource set may be described.

In an embodiment, the base station may configure a plurality of CSI-RS resource sets including one or more CSI-RS resources, and configure a superset (e.g., NZP-CSI-RS-ResourceSuperSet) of CSI-RS resources including two or more of the plurality of CSI-RS resource sets. According to the embodiment of FIG. 8, the terminal is required to use a resource for selecting a representative CRI as many as the number of CSI-RS resource sets (e.g., a total of 3 CSI-RS resource sets y to y+1). However, according to this embodiment, the terminal may use a resource for selecting a representative CRI only as many as the number of supersets of CSI-RS resources including two or more of the plurality of CSI-RS resource sets. Accordingly, the terminal may select only a smaller number of representative CRIs compared to the embodiment of FIG. 8, thereby achieving an effect of saving a resource by reducing the number of representative CRI selections.

In an embodiment, the base station may transmit an RRC message (e.g., an RRC reconfiguration message) to the terminal to change a configuration value for a superset of CSI-RS resources. In this case, the RRC message (e.g., the RRC reconfiguration message) may include information for reconfiguring the configuration value for the superset of CSI-RS resources in the terminal.

In an embodiment, the base station may indicate the terminal to activate or deactivate a CSI-RS resource set included in the superset of CSI-RS resources through medium access control (MAC) layer signaling (e.g., MAC CE) in order to change the configuration value for the superset of CSI-RS resources.

In an embodiment, the base station may indicate the terminal to activate or deactivate a CSI-RS resource set included in the superset of CSI-RS resources through control information (e.g., downlink control information (DCI)) in order to change the configuration value for the superset of CSI-RS resources.

The above-described "superset of CSI-RS resources" refers to a group of a plurality of CSI-RS resource sets, and may be nothing more than a name referring to a plurality of grouped CSI-RS resource sets. Further, information on the plurality of grouped CSI-RS resource sets which may be included in the RRC message (e.g., the RRC reconfiguration message) may include identification information of the plurality of grouped CSI-RS resource sets, or information indicating one or more of the maximum number.

FIG. 16 illustrates configuration information of an offset parameter for each CSI-RS resource in a wireless communication system according to an embodiment of the disclosure.

Referring to FIG. 16, a method for configuring an offset parameter for comparing performance between CSI-RS resources having different precoding schemes by a terminal may be described. An offset parameter may refer to an offset used to compare performance between a plurality of CSI-RS resources included in one CSI-RS resource set. Referring again to FIG. 13, when the terminal calculates CSI, based on the codebook scheme, configuration information regarding an offset which may be considered to select an optimal CSI-RS resource from one CSI-RS resource set may include one or more pieces of the information in Table 2 below.

TABLE 2

| Parameter | Configuration for each CSI-RS resource ID compared to reference CSI-RS resource |
|---|---|
| power_offset | SINR gain difference according to difference in beamforming scheme |
| CQI_offset | CQI difference aligned with SINR gain difference according to difference in beamforming scheme |
| spectralEfficiency_offset | Spectral efficiency difference aligned with SINR gain difference according to difference in beamforming scheme |

When the terminal selects an optimal CSI-RS, based on an expected throughput, configuration information included in an RRC message (e.g., an RRC reconfiguration message) may include information on offsets of KPIs that the terminal may consider when calculating the expected throughput. An offset parameter in Table 2 may be configured for each CSI-RS resource to be used when comparing performance between CSI-RSs having different expected beamforming gains. The terminal may compare performance between CSI-RS s having different beamforming gains, based on an offset for each CSI-RS resource.

A power offset in Table 2 may refer to a difference in an SINR gain for each beamforming scheme included in the configuration information, and the power offset may be configured in the unit of decibel (dB). In addition, a CQI offset may refer to a difference in a CQI aligned according to the difference in the SINR gain for each beamforming scheme included in the configuration information, and the CQI offset may be configured in the unit of an integer. Further, a spectrum offset may refer to a difference in spectral efficiency aligned according to the difference in the SINR gain for each beamforming scheme included in the configuration information, and the spectrum offset may be configured in the unit of bps/Hz.

However, offset parameters in Table 2 are only one example, and the offset parameters are not limited to the information included in Table 2. Therefore, the configuration information included in the RRC message (e.g., the RRC reconfiguration message) may include another offset parameter (e.g., at least one of an RSRP, an RI, or offset parameters of other KPIs) for comparing performance between CSI-RS resources having different expected beamforming gain values.

FIG. 17 illustrates configuration information of an offset parameter for each CSI-RS resource set in a wireless communication system according to an embodiment of the disclosure.

Referring to FIG. 17, a method for configuring an offset parameter for comparing performance between representative CSI-RS resources corresponding to a representative CRI of a CSI-RS resource set by a terminal may be described. An offset parameter may refer to an offset used to select a representative CRI of all CSI-RS resource sets. Referring again to FIG. 12, when the terminal calculates CSI, based on the codebook scheme, configuration information regarding an offset which may be considered to select an optimal CSI-RS resource from among representative CSI-RS resources may include one or more pieces of information in Table 3 below.

TABLE 3

| Parameter | Configuration for each CSI-RS resource set ID compared to reference CSI-RS resource set |
|---|---|
| power_offsetForSet | SINR gain difference according to difference in beamforming scheme |
| CQI_offsetForSet | CQI difference aligned with SINR gain difference according to difference in beamforming scheme |
| spectralEfficiency_offsetForSet | Spectral efficiency difference aligned with SINR gain difference according to difference in beamforming scheme |

When the terminal selects an optimal CSI-RS among representative CSI-RS resources, based on an expected throughput, configuration information included in an RRC message (e.g., an RRC reconfiguration message) may include information on offsets of KPIs that the terminal may consider when calculating the expected throughput. The terminal may compare performance between CSI-RSs having different beamforming gains, based on an offset for each CSI-RS resource.

A power offset in Table 3 may refer to a difference in an SINR gain for each beamforming scheme included in the configuration information, and the power offset may be configured in the unit of decibel (dB). In addition, a CQI offset may refer to a difference in a CQI aligned according to the difference in the SINR gain for each beamforming scheme included in the configuration information, and the CQI offset may be configured in the unit of an integer. Further, a spectrum offset may refer to a difference in spectral efficiency aligned according to the difference in the SINR gain for each beamforming scheme included in the configuration information, and the spectrum offset may be configured in the unit of bps/Hz.

However, offset parameters in Table 3 are only one example, and the offset parameters are not limited to the information included in Table 3. Therefore, the configuration information included in the RRC message (e.g., the RRC reconfiguration message) may include another offset parameter (e.g., at least one of an RSRP, an RI, or offsets of other KPIs) for comparing performance between representative CSI-RS resources having different expected beamforming gain values.

FIG. 18 illustrates configuration information of a superset of CSI-RS resources in a wireless communication system according to an embodiment of the disclosure.

Referring to FIG. 18, a method for configuring configuration information on a superset of CSI-RS resources for each ID may be described. Referring again to FIG. 15, the base station may configure a superset of CSI-RS resources to save a resource required for the terminal to select a representative CRI. According to an embodiment of the disclosure, the base station may configure information on the superset of CSI-RS resources for each ID in configuration information included in an RRC message (e.g., an RRC reconfiguration message). Therefore, the terminal having received the RRC message (e.g., the RRC reconfiguration message) may identify (or check) CSI-RS resource sets included in each CSI-RS resource set and CSI-RS resource sets included in the superset of CSI-RS resources included in the configuration information. When the terminal selects a representative CRI for each superset of CSI-RS resources, based on the configuration information according to an embodiment of the disclosure, a delay caused by selecting a representative CRI may be reduced.

Figure 19:
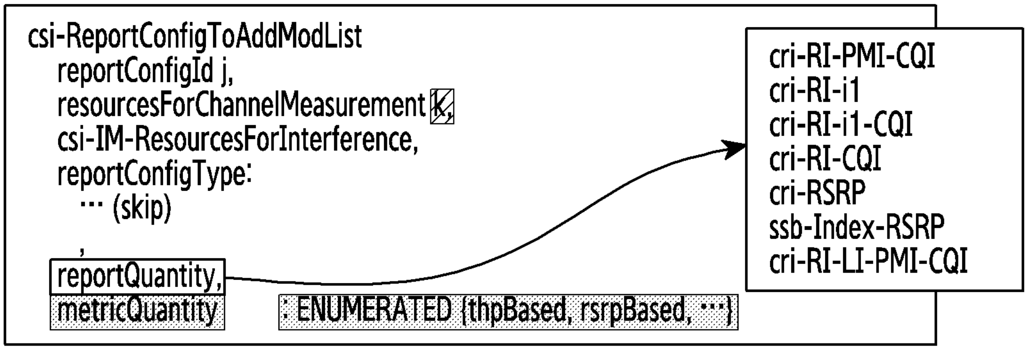
FIG. 19 illustrates a method for selecting an optimal CSI-RS resource in a wireless communication system according to an embodiment of the disclosure.

FIG. 19 illustrates a method for selecting an optimal CSI-RS resource in a wireless communication system according to an embodiment of the disclosure.

Referring to FIG. 19, a method in which a terminal selects an optimal CSI-RS resource among CSI-RS resources through a metric selectable in a specific information element (IE) may be described. The base station may configure, in the terminal, IEs required for performance comparison between CSI-RS resources and metrics selectable in each IE through an RRC message (e.g., an RRC reconfiguration message). In an embodiment, the IEs (e.g., reportQuantity) required for performance comparison between the CSI-RS resources may include at least one of cri-RI-PMI-CQI, cri-RI-il, cri-RI-il-CQI, cri-RI-CQI, cri-RSRP, ssb-Index-RSRP, or cri-RI-LI-PMI-CQI. In addition, a metric (e.g., metricQuantity) selectable in each IE may include at least one of thpBased or rsrpBased. The IEs required for performance comparison between the CSI-RS resources and the metrics selectable in each IE are not limited to the example described above. In this case, configuration information may include metrics selectable in each IE in the form of "ENUMERATED". However, metrics selectable in each IE in the configuration information may be configured in the form of "CHOICE" and are not limited to the form of "ENUMERATED" or "CHOICE".

Figure 20:
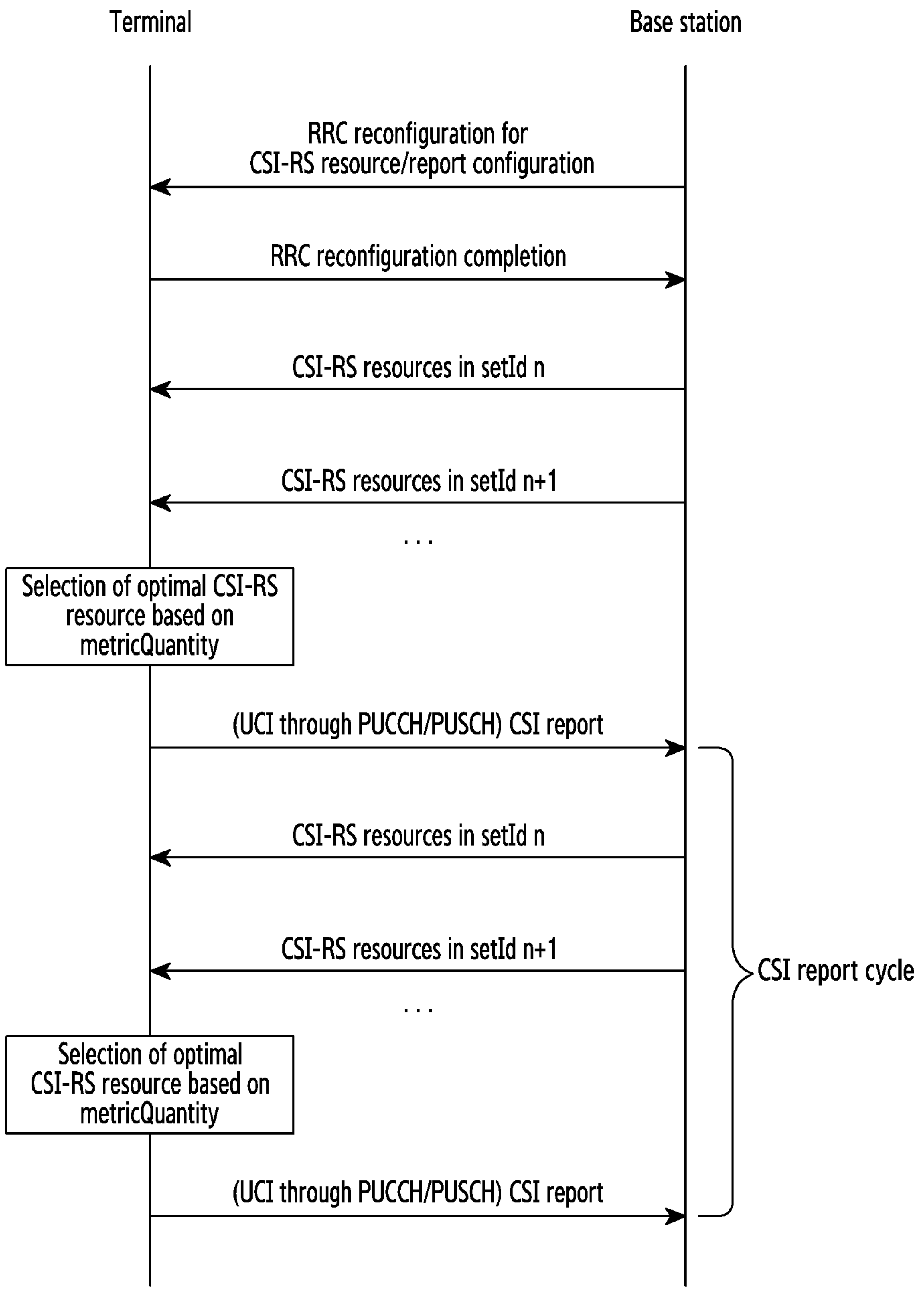
FIG. 20 illustrates a method for selecting an optimal CSI-RS resource in a wireless communication system according to an embodiment of the disclosure.

FIG. 20 illustrates a method for selecting an optimal CSI-RS resource in a wireless communication system according to an embodiment of the disclosure.

Referring to FIG. 20, in order for the terminal to select an optimal CSI-RS resource, a method for selecting a CSI-RS resource which maximizes an object function according to a configured metric (e.g., metricQuantity) according to an embodiment disclosed in FIG. 19 may be described. A performance metric according to a metric (e.g., metricQuantity) configuration selectable in each IE may be configured by one of methods in Table 4 below.

TABLE 4

| metricQuantity | Performance metric |
|---|---|
| thpBased (for embodiment of FIG. 13) | Method 1-1. maximize $F_{SE}$(measured CQI + CQI_offsetForSet) × measured RI<br>Method 1-2. maximize ($F_{SE}$(measured CQI) + spectralEfficiency_offsetForSet) × measured RI |
| thpBased (for embodiment of FIG. 14) | Method 1-3. maximize $F_{SE}$(measured CQI + CQI_offset) × measured RI<br>Method 1-4. maximize ($F_{SE}$(measured CQI) + spectralEfficiency_offset) × measured RI |
| rsrpBased (for embodiment of FIG. 13) | Method 2-1. maximize measured RSRP + power_offsetForSet |
| rsrpBased (for embodiment of FIG. 14) | Method 2-2. maximize measured RSRP + power_offset |
| etc. | Method 3. maximize other KPIs (e.g., SINR, RSRQ, CQI, etc. (considering an offset value)) |

In Table 4 above, "thpBased" may include methods for selecting a CSI-RS resource which maximizes an expected data rate, and "rsrpBased" may include methods for selecting a CSI-RS resource having the highest RSRP. Further, FSE (i) may refer to spectral efficiency mapped to CQI index i. For example, FSE(10) may have a value of 4.5234 bps/Hz. A performance metric value included in Table 4 may be expressed differently depending on configuration for metricQuantity and an offset value (e.g., an offset in the embodiments of FIGS. 16 and 17).

In an embodiment, if metricQuantity is thpBased, methods for selecting a CSI-RS resource which maximizes a data transmission rate may vary according to the above-described respective embodiments of FIGS. 13 and 14. First, in the case of the embodiment of FIG. 13, in method 1-1, a performance metric may be expressed as the product of a value which maximizes FSE (measured CQI+CQI_offsetForSet) and a measured RI. In method 1-2, a performance metric may be expressed as the product of a value which maximizes (FSE (measured CQI)+spectralEfficiency_offsetForSet) and a measured RI. Further, in the case of the embodiment of FIG. 14, in method 1-3, a performance metric may be expressed as the product of a value which maximizes FSE (measured CQI+CQI_offset) and a measured RI. In method 1-4, a performance metric may be expressed as the product of a value which maximizes (FSE (measured CQI) spectralEfficiency_offset) and a measured RI.

In an embodiment, if metricQuantity is rsrpBased, methods for selecting a CSI-RS resource which maximizes a data transmission rate may vary according to the above-described respective embodiments of FIGS. 13 and 14. First, in the case of the embodiment of FIG. 13 (i.e., method 2-1), a performance metric may be expressed as the sum of a value which maximizes a measured RSRP and power_offsetForSet. In the case of the embodiment of FIG. 14 (i.e., method 2-2), a performance metric may be expressed as the sum of power_offset and a value which maximizes a measured RSRP.

In an embodiment, in the case of other metricQuantity, a performance metric may be expressed as a value which maximizes a KPI (e.g., considering an offset value such as an SINR, an RSRQ, a CQI, etc.) corresponding to metricQuantity.

FIG. 20 illustrates an operation in which a terminal periodically transmits a CSI report to a base station, but the above-described embodiment may not be limited to a periodic CSI report procedure. The base station may configure, in the terminal, configuration information related to aperiodic CSI reporting through an RRC message. The terminal may aperiodically transmit a CSI report to the base station, based on the configuration information. The terminal's operation of periodic or aperiodic CSI reporting may be preconfigured in the terminal through an RRC message. Each operation for CSI reporting according to various embodiments of the disclosure may be applied to various CSI report cases between the terminal and the base station to the extent that a person skilled in the art may clearly understand. In addition, various embodiments of the disclosure may include at least one of all, some, or combinations of some of operations described hereinafter, and in the implementable extent, combinations of some of the operations for periodic, aperiodic, or semi-persistent CSI reporting are possible. Hereinafter, operations for CSI reporting, including all of the flows of signals for periodic, aperiodic, and semi-persistent CSI reporting, are described.

FIG. 21 illustrates a method for selecting an optimal CSI-RS resource in a wireless communication system according to an embodiment of the disclosure.

Referring to FIG. 21, according to an embodiment disclosed in FIG. 20, the terminal may determine a spectral efficiency value according to a CQI index i value. However, a required signal-to-noise ratio (SNR) value may be obtained according to a specific simulation or analysis method. A table in FIG. 21 may include modulation scheme, code rateX1024, spectral efficiency, and required signal-to-noise ratio (SNR) values according to a CQI index. In this case, a required SNR may refer to a minimum SNR value to satisfy spectral efficiency mapped to each CQI index.

The terminal may select an optimal CSI-RS, based on the table in FIG. 21 including spectral efficiency and required SNR values with respect to a CQI index. The base station may preconfigure, in the terminal, a table including spectral efficiency and required SNR values with respect to a CQI index through an RRC message (e.g., an RRC reconfiguration message).

FIG. 22 illustrates a method for selecting an optimal CSI-RS resource in a wireless communication system according to an embodiment of the disclosure.

Referring to FIG. 22, in an embodiment, in a CSI calculation method based on a non-codebook scheme, a method for calculating a CQI by a terminal based on a lookup table may be described. When the terminal uses non-codebook-based beamforming (e.g., beamforming based on a precoding matrix generated based on ZF or SVD), an expected CQI index in the non-codebook scheme may be defined based on a CQI calculated by a codebook-based beamforming (i.e., PMI-based beamforming) method. That is, the terminal may use a CQI value, to which an offset configuration value is applied, for CSI calculation in the non-codebook scheme. In this case, when configuration information of an RRC message (e.g., an RRC reconfiguration message) configures that a precoding scheme is a non-codebook scheme (e.g., when precodingScheme does not include a PMI) and does not include a separate offset configuration value, the terminal may calculate a CQI, based on a lookup table.

In an embodiment, when an offset of the above-described embodiments of FIGS. 16 and 17 is applied as a single value in a CSI calculation method based on a codebook scheme, an offset configuration method may be described. A reference CSI-RS resource may refer to a CSI-RS resource which has the highest EIRP and to which PMI-based beamforming is applied. This is because a CSI-RS resource aligned to an analog beam having the smallest performance variation range according to a precoding weight may be selected as a reference. A CSI-RS resource for a reference CSI-RS resource for each offset parameter may be as shown in Table 5 below.

TABLE 5

| Offset parameter | Values of reference CSI-RS resources | Values of other CSI-RS resources (compared to reference CSI-RS resources) |
|---|---|---|
| power_offset(ForSet) | 0 dB | (1) Beamforming gain of reference CSI-RS resource (set) - beamforming gain of corresponding CSI-RS resource (set) (unit: dB) |
| CQI_offset(ForSet) | 0 | (2) Through (1) above, it is possible to estimate SNR difference between reference CSI-RS resource (set) and corresponding CSI-RS resource (set).<br>It is possible to infer CQI index difference according to expected SNR difference with reference to certain robust CQI index or average calculation, and determine CQI offset through inferred CQI index difference. |
| spectralEfficiency_offset(ForSet) | 0 bps/Hz | In method similar to (2) above, it is possible to use spectral efficiency difference according to expected SNR difference (≈power_offset) as offset. |

In an embodiment, an offset parameter power_offset (ForSet) may be configured as a beamforming gain of a reference CSI-RS resource (set)—a beamforming gain (unit: dB) of a corresponding CSI-RS resource (set).

In an embodiment, in relation to an offset parameter CQI_offset (ForSet), the terminal may estimate an SNR difference between the reference CSI-RS resource (set) and the corresponding CSI-RS resource (set) through the above-described power_offset (ForSet). An SNR may refer to a value obtained by multiplying values together, the values being obtained by dividing a transmission power, a channel gain, and a beamforming gain by noise (SNR=T×power×channel gain×beamforming gain/noise). Further, even if a difference (≈power offset) in an expected SNR for each CQI index is not linear, the terminal may infer a CQI index difference according to an expected SNR difference with reference to a certain robust CQI index or average calculation. In addition, the terminal may determine a CQI offset through the inferred CQI index difference.

In an embodiment, in relation to an offset parameter spectralEfficiency_offset(ForSet), the terminal may determine an offset of a spectral efficiency difference according to the expected SNR difference (≈power offset) by using a method which is the same as the above-described CQI_offset(ForSet) determination method or has the same procedure as at least one of procedures as the above-described CQI_offset(ForSet) determination method.

Figure 23:
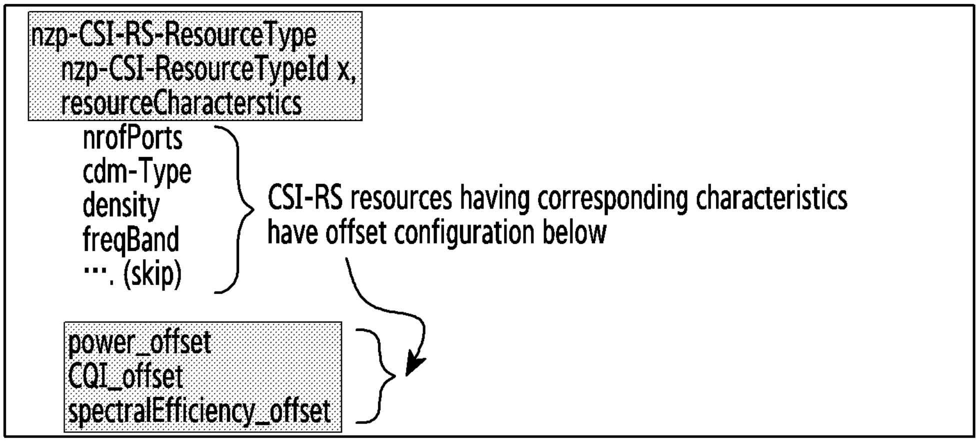
FIG. 23 illustrates a method for selecting an optimal CSI-RS resource in a wireless communication system according to an embodiment of the disclosure.

FIG. 23 illustrates a method for selecting an optimal CSI-RS resource in a wireless communication system according to an embodiment of the disclosure.

Referring to FIG. 23, a method for configuring configuration information included in an RRC message (e.g., an RRC reconfiguration message) by a base station for each combination of CSI-RS resource characteristics may be described. The base station may configure configuration information for CSI calculation and CSI reporting of the terminal in the terminal, and configure, in the terminal, information on a CSI-RS resource for each CSI-RS resource ID or CSI-RS resource set ID according to the above-described embodiment (e.g., FIG. 6).

In an embodiment, the base station may configure, in the terminal, information on a CSI-RS resource for each CSI-RS resource characteristic (e.g., including at least one of a bwp-Id, a density, or the number of ports (nrofPorts)). Specifically, the base station may configure the same offset value to be applied to CSI-RS resources having a specific bwp-Id, density, or number of ports. In this case, the base station may not configure an IE (e.g., at least one of IEs required for performance comparison between CSI-RS resources in FIG. 19) in the terminal. This is because, when a CSI-RS resource is configured for each CSI-RS resource characteristic, CSI-RS resources having a corresponding characteristic may include an offset (e.g., at least one of offsets for power, a CQI, and spectral efficiency) configuration.

According to various embodiments of the disclosure, a method performed by a terminal in a wireless communication system may include receiving a message comprising configuration information for a channel state information (CSI) report from a base station, receiving a plurality of CSI-reference signals (CSI-RSs) on different beams from the base station, generating a precoding matrix for the plurality of CSI-RSs, based on the configuration information, and transmitting the CSI report calculated based on the precoding matrix to the base station, wherein the CSI report comprises information on a CSI-RS allowing an expected throughput to have a maximum value among the plurality of CSI-RSs.

In an embodiment, the plurality of CSI-RSs may comprise at least one CSI-RS set including two or more CSI-RSs, and a plurality of CSI-RSs included in different CSI-RS sets from the at least one CSI-RS may have different values of at least one of a bandwidth part identity (bwp-Id), a density, and the number of antenna ports.

In an embodiment, the configuration information may further comprise configuration information on the at least one CSI-RS set, and the two or more CSI-RSs included in one CSI-RS set may have the same bwp-Id, density, and number of antenna ports.

In an embodiment, the configuration information may further comprise information indicating a type of precoding scheme for generating the precoding matrix and information on a method for generating the precoding matrix for each type.

In an embodiment, when the configuration information comprises a precoding matrix indicator (PMI), CSI for each of the plurality of CSI-RSs may be calculated based on the PMI, and the expected throughput may be determined based on an offset of a measurement indicator for a channel state between the terminal and the base station.

According to various embodiments of the disclosure, a method performed by a base station in a wireless communication system may comprise transmitting a message comprising configuration information for a channel state information (CSI) report to a terminal, transmitting a plurality of CSI-reference signals (CSI-RSs) on different beams to the terminal, and receiving the CSI report from the terminal, wherein CSI is based on a precoding matrix according to the configuration information, and the CSI report comprises information on a CSI-RS allowing an expected throughput to have a maximum value among the plurality of CSI-RSs.

In an embodiment, the plurality of CSI-RSs may comprise at least one CSI-RS set including two or more CSI-RSs, and a plurality of CSI-RSs included in different CSI-RS from the at least one CSI-RS sets may have different values of at least one of a bandwidth part identity (bwp-Id), a density, and the number of antenna ports.

In an embodiment, the configuration information may further comprise configuration information on the at least one CSI-RS set, and the two or more CSI-RSs included in one CSI-RS set may have the same bwp-Id, density, and number of antenna ports.

In an embodiment, the configuration information may further comprise information indicating a type of precoding scheme for generating the precoding matrix and information on a method for generating the precoding matrix for each type.

In an embodiment, when the configuration information comprises a precoding matrix indicator (PMI), the CSI for each of the plurality of CSI-RSs may be calculated based on the PMI, and the expected throughput may be determined based on an offset of a measurement indicator for a channel state between the terminal and the base station.

According to various embodiments of the disclosure, a terminal in a wireless communication system may comprise at least one transceiver, and at least one processor functionally coupled to the at least one transceiver, wherein the at least one processor is configured to receive a message comprising configuration information for a channel state information (CSI) report from a base station, receive a plurality of CSI-reference signals (CSI-RSs) on different beams from the base station, generate a precoding matrix for the plurality of CSI-RSs, based on the configuration information, and transmit the CSI report calculated based on the precoding matrix to the base station, wherein the CSI report comprises information on a CSI-RS allowing an expected throughput to have a maximum value among the plurality of CSI-RSs.

In an embodiment, the plurality of CSI-RSs may comprise at least one CSI-RS set including two or more CSI-RSs, and a plurality of CSI-RSs included in different CSI-RS sets may have different values of at least one of a bandwidth part identity (bwp-Id), a density, and the number of antenna ports.

In an embodiment, the configuration information may further comprise configuration information on the at least one CSI-RS set, and the two or more CSI-RSs included in one CSI-RS set from the at least one CSI-RS set may have the same bwp-Id, density, and number of antenna ports.

In an embodiment, the configuration information may further comprise information indicating a type of precoding scheme for generating the precoding matrix and information on a method for generating the precoding matrix for each type.

In an embodiment, when the configuration information comprises a precoding matrix indicator (PMI), CSI for each of the plurality of CSI-RSs may be calculated based on the PMI, and the expected throughput may be determined based on an offset of a measurement indicator for a channel state between the terminal and the base station.

According to various embodiments of the disclosure, a base station in a wireless communication system may comprise at least one transceiver, and at least one processor functionally coupled to the at least one transceiver, wherein the at least one processor is configured to transmit a message comprising configuration information for a channel state information (CSI) report to a terminal, transmit a plurality of CSI-reference signals (CSI-RSs) on different beams to the terminal, and receive the CSI report from the terminal, wherein CSI is based on a precoding matrix according to the configuration information, and the CSI report comprises information on a CSI-RS allowing an expected throughput to have a maximum value among the plurality of CSI-RSs.

In an embodiment, the plurality of CSI-RSs may comprise at least one CSI-RS set including two or more CSI-RSs, and a plurality of CSI-RSs included in different CSI-RS sets may have different values of at least one of a bandwidth part identity (bwp-Id), a density, and the number of antenna ports.

In an embodiment, the configuration information may further comprise configuration information on the at least one CSI-RS set, and the two or more CSI-RSs included in one CSI-RS set from the at least one CSI-RS set may have the same bwp-Id, density, and number of antenna ports.

In an embodiment, the configuration information may further comprise information indicating a type of precoding scheme for generating the precoding matrix and information on a method for generating the precoding matrix for each type.

In an embodiment, when the configuration information comprises a precoding matrix indicator (PMI), the CSI for each of the plurality of CSI-RSs may be calculated based on the PMI, and the expected throughput may be determined based on an offset of a measurement indicator for a channel state between the terminal and the base station.

The methods according to the embodiments described in the claims or the specification of the disclosure may be implemented in software, hardware, or a combination of hardware and software.

As for the software, a computer-readable storage medium storing one or more programs (software modules) may be provided. One or more programs stored in the computer-readable storage medium may be configured for execution by one or more processors of an electronic device. One or more programs may include instructions for controlling an electronic device to execute the methods according to the embodiments described in the claims or the specification of the disclosure.

Such a program (software module, software) may be stored to a random access memory, a non-volatile memory including a flash memory, a read only memory (ROM), an electrically erasable programmable ROM (EEPROM), a magnetic disc storage device, a compact disc (CD)-ROM, a digital versatile disc (DVD) or other optical storage device, and a magnetic cassette. Alternatively, it may be stored to a memory combining part or all of those recording media. A plurality of memories may be included.

Also, the program may be stored in an attachable storage device accessible via a communication network such as internet, intranet, local area network (LAN), wide LAN (WLAN), or storage area network (SAN), or a communication network by combining these networks. Such a storage device may access a device which executes an embodiment of the disclosure through an external port. In addition, a separate storage device on the communication network may access the device which executes an embodiment of the disclosure.

In the specific embodiments of the disclosure, the components included in the disclosure are expressed in a singular or plural form. However, the singular or plural expression is appropriately selected according to a proposed situation for the convenience of explanation, the disclosure is not limited to a single component or a plurality of components, the components expressed in the plural form may be configured as a single component, and the components expressed in the singular form may be configured as a plurality of components.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a user equipment (UE) in a wireless communication system, the method comprising:

receiving, from a base station, configuration information for a channel state information (CSI) report, wherein the configuration information comprises at least one precoding scheme and information on CSI-RS resources;

receiving, from the base station, a plurality of CSI-reference signals (CSI-RSs) on the CSI-RS resources via different beams based on the information on the CSI-RS resources;

generating a precoding matrix for at least two CSI-RSs among the plurality of CSI-RSs, based on the at least one precoding scheme included in the configuration information; and calculating a CSI based on the precoding matrix and selecting a CSI-RS among the at least two CSI-RSs based on the CSI, wherein an expected throughput of the selected CSI-RS is highest among the at least two CSI-RSs; and transmitting, to the base station, the CSI report comprising information on the selected CSI-RS, wherein the expected throughput is determined based on an offset of at least one measurement indicator for a channel state between the UE and the base station.

2. The method of claim 1, wherein the plurality of CSI-RSs comprise at least one CSI-RS set, and wherein at least two CSI-RSs included in different CSI-RS sets from the at least one CSI-RS set have different values of at least one of a bandwidth part identity (bwp-Id), a density, or a number of antenna ports.

3. The method of claim 1, wherein the plurality of CSI-RSs comprise the at least one CSI-RS set, and wherein the at least two CSI-RSs included in one CSI-RS set from the at least one CSI-RS set have a same value of at least one of a bwp-Id, a density, or a number of antenna ports.

4. A method performed by a base station in a wireless communication system, the method comprising:

transmitting configuration information for a channel state information (CSI) report to a user equipment (UE), wherein the configuration information comprises at least one precoding scheme and information on CSI-RS resources;

transmitting, to the UE, a plurality of CSI-reference signals (CSI-RSs) on the CSI-RS resources via different beams based on the information on the CSI-RS resources; and receiving, from the UE, the CSI report comprising information on selected CSI-RS among the plurality of CSI-RSs, wherein CSI for the at least two CSI-RSs is based on the at least one precoding scheme included in the configuration information, wherein an expected throughput of the selected CSI-RS is highest among the at least two CSI-RSs, and wherein the expected throughput is based on an offset of at least one measurement indicator for a channel state between the UE and the base station.

5. The method of claim 4, wherein the plurality of CSI-RSs comprise at least one CSI-RS set, and wherein at least two of CSI-RSs included in different CSI-RS sets from the at least one CSI-RS set have different values of at least one of a bandwidth part identity (bwp-Id), a density, or a number of antenna ports.

6. The method of claim 4, wherein the plurality of CSI-RSs comprise the at least one CSI-RS set, and wherein the at least two CSI-RSs included in one CSI-RS set from the at least one CSI-RS set have a same value of at least one of a bwp-Id, a density, or a number of antenna ports.

7. A user equipment (UE) comprising:

at least one transceiver;

at least one processor communicatively coupled to the at least one transceiver; and at least one memory, communicatively coupled to the at least one processor, storing instructions executable by the at least one processor individually or in any combination to cause the UE to:

receive, from a base station, configuration information for a channel state information (CSI) report, wherein the configuration information comprises at least one precoding scheme and information on CSI-RS resources, receive, from the base station, a plurality of CSI-reference signals (CSI-RSs) on the CSI-RS resources via different beams based on the information on the CSI-RS resources, generate a precoding matrix for at least two CSI-RSs among the plurality of CSI-RSs, based on the at least one precoding scheme included in the configuration information, and calculating a CSI based on the precoding matrix and selecting a CSI-RS among the at least two CSI-RSs based on the CSI, wherein an expected throughput of the selected CSI-RS is highest among the at least two CSI-RSs, and transmit, to the base station, the CSI report comprising information on the selected CSI-RS, wherein the expected throughput is determined based on an offset of at least one measurement indicator for a channel state between the UE and the base station.

8. The UE of claim 7, wherein the plurality of CSI-RSs comprise at least one CSI-RS set and wherein at least two CSI-RSs included in different CSI-RS sets from the at least one CSI-RS set have different values of at least one of a bandwidth part identity (bwp-Id), a density, or a number of antenna ports.

9. The UE of claim 7, wherein the plurality of CSI-RSs comprise the at least one CSI-RS set, and wherein the at least two CSI-RSs included in one CSI-RS set from the at least one CSI-RS set have a same value of at least one of a bwp-Id, a density, or a number of antenna ports.

10. A base station comprising:

at least one transceiver;

at least one processor communicatively coupled to the at least one transceiver; and at least one memory, communicatively coupled to the at least one processor, storing instructions executable by the at least one processor individually or in any combination to cause the base station to:

transmit configuration information for a channel state information (CSI) report to a user equipment (UE), wherein the configuration information comprises at least one precoding scheme and information on CSI-RS resources, transmit, to the UE, a plurality of CSI-reference signals (CSI-RSs) on the CSI-RS resources via different beams based on the information on the CSI-RS resources, and receive, from the UE, the CSI report comprising information on selected CSI-RS among the plurality of CSI-RSs, wherein CSI for the at least two CSI-RSs is based on the at least one precoding scheme included in the configuration information, wherein an expected throughput of the selected CSI-RS is highest among the at least two CSI-RSs, and wherein the expected throughput is based on an offset of at least one measurement indicator for a channel state between the UE and the base station.

11. The base station of claim 10, wherein the plurality of CSI-RSs comprise at least one CSI-RS set, and wherein at least two of CSI-RSs included in different CSI-RS sets from the at least one CSI-RS set have different values of at least one of a bandwidth part identity (bwp-Id), a density, or a number of antenna ports.

12. The base station of claim 10, wherein the plurality of CSI-RSs comprise the at least one CSI-RS set, and wherein the at least two CSI-RSs included in one CSI-RS set from the at least one CSI-RS set have a same value of at least one of a bwp-Id, a density, or a number of antenna ports.

* * * * *